(12) United States Patent
Takebayashi

(10) Patent No.: US 11,097,738 B2
(45) Date of Patent: Aug. 24, 2021

(54) CONTROL APPARATUS FOR VEHICLE

(71) Applicant: Toyota Jidosha Kabushiki Kaisha, Toyota (JP)

(72) Inventor: Noritaka Takebayashi, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/899,824

(22) Filed: Jun. 12, 2020

(65) Prior Publication Data

US 2020/0391743 A1 Dec. 17, 2020

(30) Foreign Application Priority Data

Jun. 14, 2019 (JP) .............................. JP2019-111572

(51) Int. Cl.
*B60W 30/188* (2012.01)
*B60W 10/10* (2012.01)
(Continued)

(52) U.S. Cl.
CPC ............. *B60W 30/188* (2013.01); *B60K 5/00* (2013.01); *B60K 17/08* (2013.01); *B60W 10/06* (2013.01); *B60W 10/10* (2013.01); *F02D 41/0002* (2013.01); *F02N 11/0822* (2013.01); *F15B 11/20* (2013.01); *F16H 57/0446* (2013.01);
(Continued)

(58) Field of Classification Search
CPC .... B60W 30/188; B60W 10/06; B60W 10/10; B60W 2510/1015; B60W 2510/108; B60W 2520/105; B60W 2710/0633; B60W 2710/1011; B60K 5/00; B60K 17/08; F02D 41/0002; F02N 11/0822; F15B 11/20; F15B 2211/55; F15B 2211/7053; F15B 2211/71; F16H 57/0446; F16H 61/0025; F16H 61/30; F16H 63/50; F16H 2061/0037
See application file for complete search history.

(56) References Cited

U.S. PATENT DOCUMENTS

| 5,743,826 A * | 4/1998 | Usuki ..................... F16H 61/08 |
| | | 477/120 |
| 2005/0187070 A1* | 8/2005 | Takagi .................. F16H 61/061 |
| | | 477/143 |
| 2015/0032316 A1 | 1/2015 | Chin et al. |

FOREIGN PATENT DOCUMENTS

| JP | 11-321277 A | 11/1999 |
| JP | 2009-058000 A | 3/2009 |

(Continued)

*Primary Examiner* — Tisha D Lewis
(74) *Attorney, Agent, or Firm* — Oblon, McClelland, Maier & Neustadt, L.L.P.

(57) ABSTRACT

A control apparatus for a vehicle includes an input-rotation limiting portion configured, when the vehicle starts running and is accelerated, to calculate an estimated speed value that is a speed value of an input rotational speed of an automatic transmission upon elapse of a predetermined length of time, and to calculate an estimated force value that is a force value of a piston pressing force acting on a piston in a forward direction in a released engagement device upon the elapse of the predetermined length of time, based on a centrifugal hydraulic pressure in a pressure chamber of the released engagement device and the centrifugal hydraulic pressure in a canceller chamber of the released engagement device. When the estimated force value is not smaller than a predetermined threshold, the input-rotation limiting portion restrains an increase of the input rotational speed.

8 Claims, 9 Drawing Sheets

(51) Int. Cl.
  *B60K 17/08* (2006.01)
  *F02N 11/08* (2006.01)
  *F02D 41/00* (2006.01)
  *B60W 10/06* (2006.01)
  *F16H 63/50* (2006.01)
  *F16H 61/00* (2006.01)
  *F16H 61/30* (2006.01)
  *F16H 57/04* (2010.01)
  *F15B 11/20* (2006.01)
  *B60K 5/00* (2006.01)
  *F16H 3/66* (2006.01)

(52) U.S. Cl.
  CPC ......... *F16H 61/0025* (2013.01); *F16H 61/30* (2013.01); *F16H 63/50* (2013.01); *B60W 2510/108* (2013.01); *B60W 2510/1015* (2013.01); *B60W 2520/105* (2013.01); *B60W 2710/0633* (2013.01); *B60W 2710/1011* (2013.01); *F15B 2211/55* (2013.01); *F15B 2211/7053* (2013.01); *F15B 2211/71* (2013.01); *F16H 3/663* (2013.01); *F16H 2061/0037* (2013.01); *F16H 2200/0052* (2013.01); *F16H 2200/201* (2013.01); *F16H 2200/2028* (2013.01); *F16H 2200/2043* (2013.01); *F16H 2200/2066* (2013.01); *F16H 2200/2082* (2013.01)

(56) References Cited

FOREIGN PATENT DOCUMENTS

| | | |
|---|---|---|
| JP | 2013-047537 A | 3/2013 |
| WO | WO 2013/140696 A1 | 9/2013 |

* cited by examiner

|  | C1 | C2 | B1 | B2 | B3 | F1 |
|---|---|---|---|---|---|---|
| 1st | O |  |  | □ |  | △ |
| 2nd | O |  | O |  |  |  |
| 3rd | O |  |  |  | O |  |
| 4th | O | O |  |  |  |  |
| 5th |  | O |  |  | O |  |
| 6th |  | O | O |  |  |  |
| R |  |  |  | O | O |  |
| N |  |  |  |  |  |  |

□ ENGAGED DURING ENGINE BRAKE
△ ENGAGED ONLY DURING DRIVING STATE

CONTROL APPARATUS FOR VEHICLE

This application claims priority from Japanese Patent Application No. 2019-111572 filed on Jun. 14, 2019, the disclosure of which is herein incorporated by reference in its entirety.

FIELD OF THE INVENTION

The present invention relates in general to a control apparatus for a vehicle, and, more particularly, to a control apparatus for a vehicle provided with an automatic transmission including hydraulic friction engagement devices, wherein each of at least one of the hydraulic friction engagement devices is to be engaged by a hydraulic cylinder that has a canceller chamber configured to cancel a centrifugal hydraulic pressure.

BACKGROUND OF THE INVENTION

There is known a vehicle including (i) an engine that is used as a drive force source for driving the vehicle, and (ii) an automatic transmission disposed in a drive-force transmitting path between the engine and drive wheels of the vehicle, wherein the automatic transmission includes a plurality of hydraulic friction engagement devices, and is configured to establish a plurality of gear positions depending on engaged/released states of the hydraulic friction engagement devices, wherein each of at least one of the hydraulic friction engagement devices includes a hydraulic cylinder that has a piston, a pressure chamber defined on one of opposite sides of the piston and a canceller chamber defined on the other of the opposite sides of the piston, such that the pressure chamber is configured to move the piston, based on a hydraulic pressure of the fluid supplied to the pressure chamber, in a forward direction that causes the each of the at least one of the hydraulic friction engagement devices to be engaged, and such that the canceller chamber is configured to cancel a thrust force based on a centrifugal hydraulic pressure of the fluid in the pressure chamber, by supply of the fluid to the canceller chamber, and wherein the automatic transmission further includes a hydraulic control unit including a mechanical oil pump that is to be mechanically driven by the engine to supply the fluid to the pressure chamber and the canceller chamber of the hydraulic cylinder (see JP-2009-58000A). In such a vehicle, with the fluid being supplied to the canceller chamber, it is possible to restrain forward movement of the piston of the hydraulic cylinder in a released engagement device, wherein the forward movement is caused by the centrifugal hydraulic pressure generated in the fluid remaining in the pressure chamber in the released engagement device. That is, with the fluid being supplied to the canceller chamber, it is possible to restrain dragging caused in the released engagement device.

SUMMARY OF THE INVENTION

By the way, the fluid supplied to the canceller chamber serves as a lubricant oil, and quickly flows out of the canceller chamber when supply of the fluid from the mechanical oil pump is stopped together with stop of rotation of the drive force source such as an engine or a motor. Meanwhile, to the pressure chamber, the fluid whose pressure is regulated by a valve such as a regulator valve is supplied, so that the fluid supplied to the pressure chamber is limited, by the valve, from flowing out of the pressure chamber even when the mechanical oil pump is stopped. Therefore, if the hydraulic cylinder of the released engagement device is rotated at a high speed by a sudden start acceleration of the vehicle shortly after the start of the engine or the motor, a large forward thrust force is generated by the centrifugal hydraulic pressure of a relatively large amount of the fluid remaining in the pressure chamber, while a small reverse thrust force is generated by the centrifugal hydraulic pressure of a relatively small amount of the fluid remaining in the canceller chamber, so that a pressing force based on a difference of the forward thrust force and the reverse thrust force acts on the piston whereby the dragging could be caused in the released engagement device.

The present invention was made in view of the background art described above. It is therefore an object of the present invention to restrain dragging caused in the released engagement device due to shortage of the fluid in the canceller chamber when the vehicle starts running and is accelerated shortly after the start of the drive force source.

The above-described object indicated above is achieved according to the following aspects of the present invention.

According to a first aspect of the invention, there is provided a control apparatus for a vehicle that includes (i) a drive force source for driving the vehicle, and (ii) an automatic transmission disposed in a drive-force transmitting path between the drive force source and drive wheels of the vehicle, wherein the automatic transmission includes a plurality of hydraulic friction engagement devices, and is configured to establish a plurality of gear positions depending on engaged/released states of the hydraulic friction engagement devices, wherein each of at least one of the hydraulic friction engagement devices includes a hydraulic cylinder that has a piston, a pressure chamber defined on one of opposite sides of the piston and a canceller chamber defined on the other of the opposite sides of the piston, such that the piston is to be moved, based on a hydraulic pressure of a fluid supplied to the pressure chamber, in a forward direction that causes the each of the at least one of the hydraulic friction engagement devices to be engaged, and such that the canceller chamber is configured to cancel a thrust force based on a centrifugal hydraulic pressure of the fluid in the pressure chamber, by supply of the fluid to the canceller chamber, wherein the automatic transmission further includes a hydraulic control unit including a mechanical oil pump that is to be mechanically driven by the drive force source to generate the hydraulic pressure, and configured to supply the fluid to the pressure chamber and the canceller chamber of the hydraulic cylinder, wherein the control apparatus comprises an input-rotation limiting portion that is configured, when the vehicle starts running and is accelerated, with at least one of the at least one of the hydraulic friction engagement devices being released, to calculate an estimated speed value that is a speed value of an input rotational speed of the automatic transmission upon elapse of a predetermined length of time, and to calculate an estimated force value that is a force value of a piston pressing force acting on the piston in the forward direction in a released engagement device that is each of the at least one of the at least one of the hydraulic friction engagement devices upon the elapse of the predetermined length of time, based on the centrifugal hydraulic pressure of the fluid in the pressure chamber of the released engagement device and the centrifugal hydraulic pressure of the fluid in the canceller chamber of the released engagement device that are dependent on the estimated speed value, and wherein, when the estimated force value is not smaller than a predetermined threshold, the input-rotation limiting portion is configured to restrain an increase of the input rotational speed.

According to a second aspect of the invention, in the control apparatus according to the first aspect of the invention, the drive force source is an engine, wherein the control apparatus further comprises an engine automatic-stop controlling portion configured, when the vehicle is stopped, to cause the engine to be automatically stopped, and wherein, when the vehicle starts running and is accelerated after the engine has been automatically stopped by the engine automatic-stop controlling portion, the input-rotation limiting portion is configured to calculate the estimated speed value, and to calculate the estimated force value based on the centrifugal hydraulic pressure of the fluid in the pressure chamber and the centrifugal hydraulic pressure of the fluid in the canceller chamber, such that the input-rotation limiting portion restrains the increase of the input rotational speed when the estimated force value is not smaller than the predetermined threshold.

According to a third aspect of the invention, in the control apparatus according to the first or second aspect of the invention, the automatic transmission is configured to establish the plurality of gear positions including a plurality of forward gear positions providing gear ratios that are different from each other, wherein the hydraulic cylinder of the released engagement device is connected to an input shaft of the automatic transmission, so as to be rotated at a rotational speed that is equal to the input rotational speed, and wherein the input-rotation limiting portion is configured, when the estimated force value is not smaller than the predetermined threshold, to restrain the increase of the input rotational speed by shifting up the automatic transmission.

According to a fourth aspect of the invention, in the control apparatus according to the second aspect of the invention, the input-rotation limiting portion is configured, when the estimated force value is not smaller than the predetermined threshold, to restrain the increase of the input rotational speed by limiting an air intaken into the engine.

According to a fifth aspect of the invention, in the control apparatus according to the first through fourth aspect of the invention, the input-rotation limiting portion includes a fluid-amount calculating portion and a pressing-force calculating portion, wherein the fluid-amount calculating portion is configured to calculate an amount of the fluid remaining in the canceller chamber, based on a length of time for which the mechanical oil pump had been stopped, and to calculate an amount of the fluid supplied to the canceller chamber, based on a length of time that elapsed from a start of the mechanical oil pump, such that the fluid-amount calculating portion obtains a canceller-chamber-side fluid amount by adding the amount of the fluid remaining in the canceller chamber and the amount of the fluid supplied to the canceller chamber, and wherein the pressing-force calculating portion is configured to calculate, based on the estimated speed value and the canceller-chamber-side fluid amount, a reverse thrust force by which the piston is forced in a reverse direction opposite to the forward direction, and to obtain the estimated force value by subtracting the reverse thrust force from a forward thrust force that is dependent on the fluid in the pressure chamber.

According to a sixth aspect of the invention, in the control apparatus according to the fifth aspect of the invention, the fluid-amount calculating portion is configured to calculate an amount of the fluid remaining in the pressure chamber, based on the length of time for which the mechanical oil pump had been stopped, wherein the pressing-force calculating portion is configured to calculate the forward thrust force, based on the estimated speed value and the amount of the fluid remaining in the pressure chamber, and to obtain the estimated force value by subtracting the reverse thrust force from the forward thrust force. In the control apparatus according to the sixth aspect of the invention, the calculated amount of the fluid remaining in the pressure chamber is regarded as a pressure-chamber-side fluid amount.

According to a seventh aspect of the invention, in the control apparatus according to any one of the first through sixth aspects of the invention, the hydraulic control unit includes a line-pressure regulator valve and an engaging/releasing regulator valve that are connected to a line-pressure passage to which the fluid is to be supplied from the mechanical oil pump, wherein the line-pressure regulator valve is configured to regulate the hydraulic pressure in the line-pressure passage, to a line pressure, by relieving a part of the fluid from the line-pressure passage, such that a relief fluid, which is the part of the fluid relieved by the line-pressure regulator valve, is supplied to the canceller chamber and lubrication-required parts, and wherein the engaging/releasing regulator valve is configured to receive the line pressure, such that the fluid regulated by the engaging/releasing regulator valve is supplied to the pressure chamber.

According to an eighth aspect of the invention, in the control apparatus according to any one of the seventh aspect of the invention, the hydraulic control unit further includes a second line-pressure regulator valve that is other than the line-pressure regulator valve as a first line-pressure regulator valve, wherein the second line-pressure regulator valve is connected to a second line-pressure passage to which the relief fluid relieved by the first line-pressure regulator valve is supplied, wherein the second line-pressure regulator valve is configured to regulate the hydraulic pressure in the second line-pressure passage, to a second line pressure, by relieving a part of the relief fluid from the second line-pressure passage, and wherein the second line-pressure regulator valve is configured, when the mechanical oil pump is started, to reduce the second line pressure, such that a flow rate of the fluid supplied to the canceller chamber and the lubrication-required parts through the second line-pressure passage is reduced.

In the control apparatus according to any one of the first through eighth aspects of the invention, the input-rotation limiting portion is configured, when the vehicle starts running and is accelerated, with the released engagement device being released, to calculate the estimated speed value that is the speed value of the input rotational speed of the automatic transmission upon elapse of the predetermined length of time, and to calculate an estimated force value that is the force value of the piston pressing force acting on the piston in the forward direction in the released engagement device upon the elapse of the predetermined length of time, based on the centrifugal hydraulic pressure of the fluid in the pressure chamber of the released engagement device and the centrifugal hydraulic pressure of the fluid in the canceller chamber of the released engagement device that are dependent on the estimated speed value. When the estimated force value is not smaller than the predetermined threshold, the input-rotation limiting portion is configured to restrain the increase of the input rotational speed, so that it is possible to restrain an increase of a rotational speed of the hydraulic cylinder of the released engagement device, and also to restrain an increase of the piston pressing force based on a difference between the centrifugal hydraulic pressure of the fluid in the pressure chamber and the centrifugal hydraulic pressure of the fluid in the canceller chamber. Thus, when the vehicle starts running and is accelerated shortly after the start of the drive force source, it is possible to restrain the piston pressing force from being increased to exceed the predetermined threshold due to shortage of the fluid in the canceller chamber, and accordingly to restrain the released engagement device from being dragged due to the increase of the piston pressing force.

In the control apparatus according to the second aspect of the invention, there is further provided the engine automatic-stop controlling portion that is configured, when the vehicle is stopped, to cause the engine as the drive force source to be automatically stopped. In general, there is a higher probability that the vehicle is caused to start and to be accelerated immediately after the engine is started when the engine is started after having been returned from the engine automatic stop, than when the engine is started not after having been returned from the engine automatic stop. That is, the hydraulic cylinder could be rotated at a high speed by a sudden start acceleration of the vehicle in a stage in which an amount of the fluid supplied from the mechanical oil pump is still small, whereby the piston pressing force could be increased due to shortage of the fluid in the canceller chamber, so that the dragging could be caused in the released engagement device. However, the input-rotation limiting portion is configured to calculate the estimated force value based on the centrifugal hydraulic pressure of the fluid in the pressure chamber and the centrifugal hydraulic pressure of the fluid in the canceller chamber that are dependent on the estimated speed value, and is configured to restrain the increase of the input rotational speed when the estimated force value is not smaller than the predetermined threshold. Thus, when the vehicle starts running and is accelerated shortly after the engine has been returned from the engine automatic stop, it is possible to appropriately restrain the released engagement device from being dragged due to shortage of the fluid in the canceller chamber.

The control apparatus according to the third aspect of the invention is to be provided in the vehicle including the automatic transmission in which the hydraulic cylinder of the released engagement device is connected to the input shaft of the automatic transmission, so as to be rotated at the rotational speed that is equal to the input rotational speed. In the control apparatus according to the third aspect of the invention, the input-rotation limiting portion is configured, when the estimated force value is not smaller than the predetermined threshold, to restrain the increase of the input rotational speed by shifting up the automatic transmission. Thus, the increase of the rotational speed of the hydraulic cylinder of the released engagement device as well as the increase of the input rotational speed is reliably restrained, so that it is possible to appropriately restrain the released engagement device from being dragged due to the increase of the centrifugal hydraulic pressure which could be caused by the increase of the rotational speed of the hydraulic cylinder.

In the control apparatus according to the fourth aspect of the invention, the input-rotation limiting portion is configured, when the estimated force value is not smaller than the predetermined threshold, to restrain the increase of the input rotational speed by limiting the air intaken into the engine. Thus, it is possible to restrain the released engagement device from being dragged due to the increase of the centrifugal hydraulic pressure in the hydraulic cylinder of the released engagement device which could be caused by the increase of the input rotational speed.

In the control apparatus according to the fifth aspect of the invention, the fluid-amount calculating portion is configured to calculate the amount of the fluid remaining in the canceller chamber, based on the length of time for which the mechanical oil pump had been stopped, and to calculate the amount of the fluid supplied to the canceller chamber, based on the length of time that elapsed from the start of the mechanical oil pump, so as to obtain the canceller-chamber-side fluid amount based on the amount of the fluid remaining in the canceller chamber and the amount of the fluid supplied to the canceller chamber. Further, the pressing-force calculating portion is configured to calculate the reverse thrust force, based on the estimated speed value and the canceller-chamber-side fluid amount, and to obtain the estimated force value by subtracting the reverse thrust force from the forward thrust force. Thus, the estimated force value can be obtained with a high accuracy, so that it is possible to appropriately restrain the released engagement device from being dragged, and also to restrain reduction of a start acceleration performance of the vehicle, which could be caused if the increase of the input rotational speed were limited more than necessary.

In the control apparatus according to the sixth aspect of the invention, the fluid-amount calculating portion is configured to calculate the amount of the fluid remaining in the pressure chamber, based on the length of time for which the mechanical oil pump had been stopped, and the pressing-force calculating portion is configured to calculate the forward thrust force, based on the estimated speed value and the amount of the fluid remaining in the pressure chamber, with the amount of the fluid remaining in the pressure chamber being regarded to be equal to the pressure-chamber-side fluid amount. Thus, the estimated force value can be obtained with a further high accuracy, so that it is possible to appropriately restrain the released engagement device from being dragged, and also to restrain reduction of the start acceleration performance of the vehicle, which could be caused if the increase of the input rotational speed were limited more than necessary.

The control apparatus according to the seventh aspect of the invention is to be provided in the vehicle including the automatic transmission in which the hydraulic control unit includes the line-pressure regulator valve having a relief function and the engaging/releasing regulator valve, wherein the line-pressure regulator valve is configured to regulate the hydraulic pressure in the line-pressure passage, to the line pressure, such that the relief fluid is supplied from the line-pressure regulator valve to the canceller chamber and the lubrication-required parts, and wherein the engaging/releasing regulator valve is configured to receive the line pressure, such that the fluid regulated by the engaging/releasing regulator valve is supplied to the pressure chamber. In this arrangement, when the supply of the fluid is stopped together with the engine stop, for example, by execution of the engine automatic-stop control, the fluid is caused to rapidly flow out of the canceller chamber that is exposed to an atmosphere through the lubrication-required parts, so that the released engagement device could be dragged due to the fluid flow out of the canceller chamber when the vehicle starts running and is accelerated. Thus, in this arrangement, which could suffer from the dragging in the released engagement device, the advantage provided by the present invention is effective, wherein the advantage is to reliably restrain the released engagement device from being dragged due to shortage of the fluid in the canceller chamber, by calculating the estimated force value and restraining the increase of the input rotational speed in a case in which the estimated force value is not smaller than the predetermined threshold.

The control apparatus according to the eighth aspect of the invention is to be provided in the vehicle the automatic transmission in which the hydraulic control unit further includes the second line-pressure regulator valve that is other than the above-described line-pressure regulator valve as the first line-pressure regulator valve, wherein the second line-pressure regulator valve is connected to the second line-pressure passage to which the relief fluid relieved by the first line-pressure regulator valve is supplied. In the control apparatus according to the eighth aspect of the invention, the second line-pressure regulator valve is configured to regulate the hydraulic pressure in the second line-pressure passage, to the second line pressure, by relieving the part of the relief fluid from the second line-pressure passage, wherein the second line-pressure regulator valve is configured, when the mechanical oil pump is started, to reduce the second line pressure, such that the flow rate of the fluid supplied to the canceller chamber and the lubrication-required parts through the second line-pressure passage is reduced. In this arrangement, the fluid is supplied to the lubrication-required parts at a minimally required rate whereby a fuel economy of the vehicle is improved, but there is a possibility that the released engagement device could be dragged due to shortage of the fluid in the canceller chamber upon running start and acceleration of the vehicle since the flow rate of the fluid supplied to the canceller chamber through the second line-pressure passage is low for a while after starting of the mechanical oil pump. Thus, in this arrangement, which could suffer from the dragging in the released engagement device, the advantage provided by the present invention is effective, wherein the advantage is to restrain the released engagement device from being dragged due to shortage of the fluid in the canceller chamber, by calculating the estimated force value and restraining the increase of the input rotational speed in a case in which the estimated force value is not smaller than the predetermined threshold.

DETAILED DESCRIPTION OF PREFERRED EMBODIMENT

Figures 1, 2:
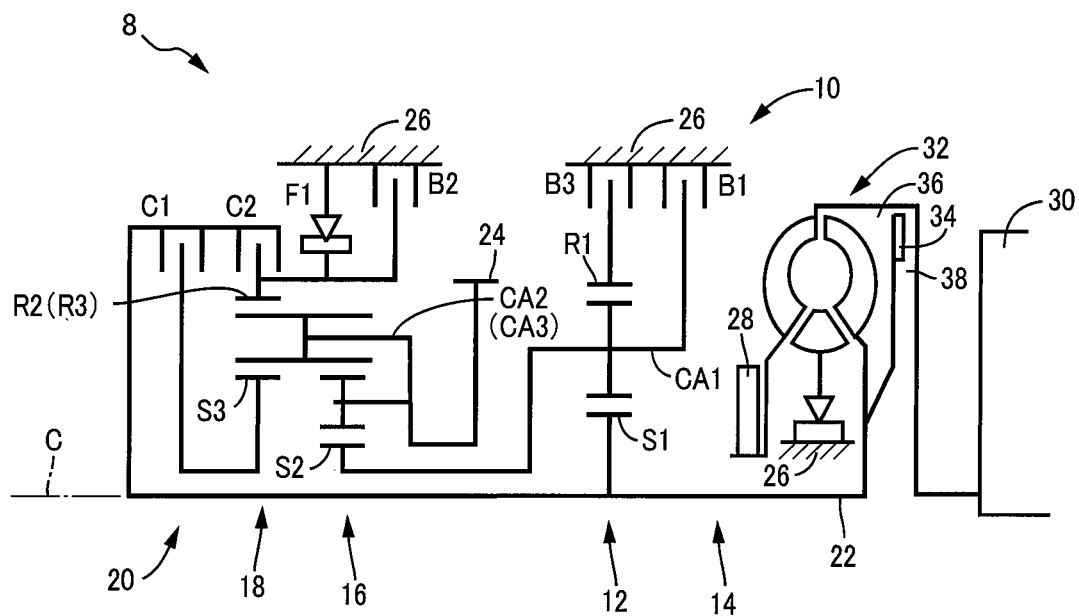
FIG. 1 is a schematic view showing, by way of example, an automatic transmission provided in a vehicle to which the present invention is applied.
FIG. 2 is a table indicating a relationship between each gear position and a combination of friction engagement devices that are to be engaged to establish the gear position in the automatic transmission of FIG. 1.

The present invention is applicable to a control apparatus for a vehicle that includes at least an engine or an electric motor as a drive force source, and also to a control apparatus for a hybrid vehicle that includes both of an engine and an electric motor as drive force sources. The engine is an internal combustion engine such as a gasoline engine or a diesel engine, which is configured to generate the drive force by combustion of a fuel. An automatic transmission, which is to be included in the vehicle, is constituted by, preferably, a planetary gear device and/or a step variable transmission of, for example, parallel-shafts type that are configured to establish a plurality of forward gear positions providing respective different gear positions. However, the automatic transmission may be constituted by also a forward/reverse switching device configured to only switch a running direction of the vehicle between forward and reverse directions. Further, the motor may be one of any kinds of motors such as an induction motor and a synchronous motor.

The present invention is applicable advantageously to a case in which the vehicle starts and is accelerated when the engine is started after having been returned from the engine automatic stop. However, the invention is applicable also to a case in which the vehicle starts and is accelerated when the engine is started not after having been returned from the engine automatic stop. Further, the input-rotation limiting portion is configured to restrain the increase of the input rotational speed, for example, by shifting up the automatic transmission and/or by limiting an intake air quantity of air intaken into the engine or an output of the electric motor. However, the input-rotation limiting portion may be modified, for example, such that the input-rotation limiting portion is configured to restrain the increase of the input rotational speed by increasing a load applied to the engine by, for example, an electric motor. With the increase of the input rotational speed being restrained, the rotation of the released engagement device is limited whereby the piston pressing force based on the centrifugal hydraulic pressure is restrained. In this instance, the rotational speed of the released engagement device does not have to be necessarily the same as the input rotational speed, as long as the rotational speed of the released engagement device is increased with the increase of the input rotational speed at least when the vehicle starts running, for example, with the automatic transmission being placed in a first (1st) gear position.

It is preferable that the input-rotation limiting portion is configured to calculate the amount of the fluid remaining in the canceller chamber, based on the length of time for which the mechanical oil pump had been stopped, and to calculate the amount of the fluid supplied to the canceller chamber, based on the length of time that elapsed from the start of the engine, so as to obtain the canceller-chamber-side fluid amount by adding the amount of the fluid remaining in the canceller chamber and the amount of the fluid supplied to the canceller chamber. The amount of the fluid supplied to the canceller chamber may be obtained in any one of various manners, for example, by using a rotational speed of the mechanical oil pump. It is preferable that the amount of the fluid remaining in the pressure chamber is calculated based on the length of time for which the engine had been stopped, and the forward thrust force is calculated based on the estimated speed value and the amount of the fluid remaining in the pressure chamber, with the amount of the fluid remaining in the pressure chamber being regarded to be equal to the pressure-chamber-side fluid amount. However, where the amount of the fluid caused to flow out of the pressure chamber is small, the forward thrust force may be calculated based on the estimated speed value and a predetermined amount as the pressure-chamber-side fluid amount, with the amount of the fluid caused to flow out of the pressure chamber being considered as an ignorable small amount.

For example, the hydraulic control unit is provided with the first and second line-pressure regulators each having a relief function, such that the pressure chamber receives the fluid whose pressure is regulated from the line pressure by the engaging/releasing regulator valve that receives the line pressure as an original pressure, and such that the canceller chamber as well as the lubrication-required parts receives a part of the fluid whose pressure is regulated to the second line pressure by the second line-pressure regulator that receives the relief fluid supplied from the first line-pressure regulator. However, the present invention is applicable to any one of various kinds of the hydraulic control units as long as the fluid is caused to flow out of the canceller chamber when the supply of the fluid from the mechanical oil pump is stopped as a result of stop of the engine.

Embodiment

Hereinafter, a preferred embodiment of the invention will be described in detail with reference to the accompanying drawings. The figures of the drawings are simplified or deformed as needed, and each portion is not necessarily precisely depicted in terms of dimension ratio, shape, etc.

FIG. 1 is a schematic view showing, by way of example, an automatic transmission 10 provided in a vehicle 8 to which the present invention is applied. FIG. 2 is a table indicating a relationship between each gear position and a combination of friction engagement devices that are to be engaged to establish the gear position in the automatic transmission 10. This automatic transmission 10 is to be used advantageously for a FF vehicle such that the transmission 10 is disposed with a plurality of axes of the transmission 10 extending in a width (lateral) direction of the vehicle. In the present embodiment, the automatic transmission 10 includes a transmission casing 26 as a non-rotary member that is attached to a body of the vehicle 8, first and second transmission portions 14, 20 that are disposed within the transmission casing 26, an input shaft 22 and an output rotary member 24, and is configured to change a rotational speed of the input shaft 22 and output the changed rotational speed as a rotational speed of the output rotary member 24. The first transmission portion 14 is constituted mainly by a first planetary gear device 12 of single-pinion type. The second transmission portion 20 is a Ravigneaux type planetary gear train that is constituted mainly by a second planetary gear device 16 of double-pinion type and a third planetary gear device 18 of single-pinion type. The first and second transmission portions 14, 20 are disposed on an axis C that are common to the two transmission portions 14, 20. The input shaft 22 corresponds to an input member of the automatic transmission 10, and is constituted by a turbine shaft of a torque converter 32 as a fluid transmission device that is to be rotated or driven by an engine 30 as a drive force source for driving the vehicle 8 in the present embodiment. The engine 30 is an internal combustion engine such as a gasoline engine or a diesel engine.

Figure 3:
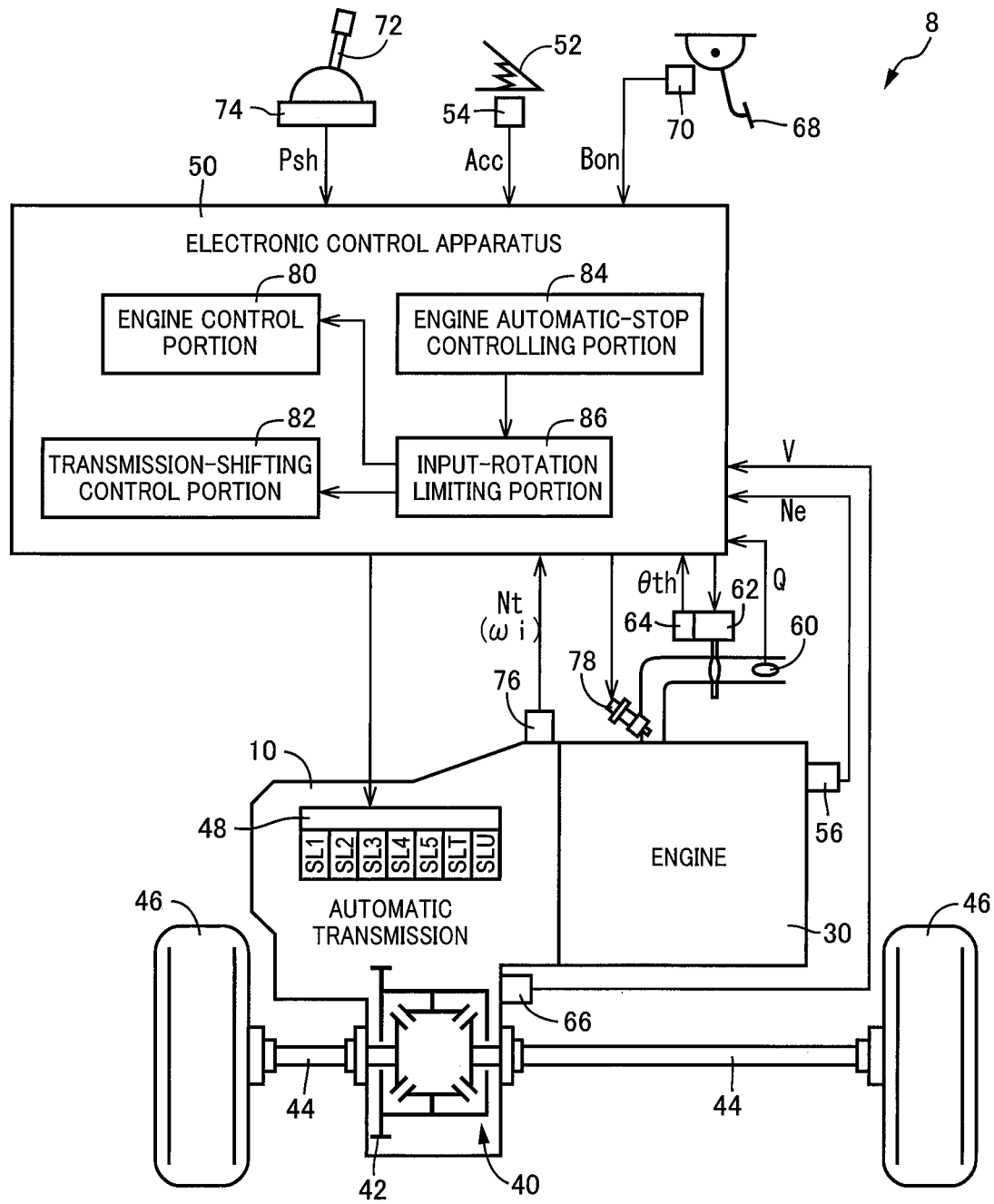
FIG. 3 is a schematic view showing a drive-force transmitting system of the vehicle provided with the automatic transmission of FIG. 1 and also a main part of an electronic control apparatus of the vehicle, wherein a drive force is to be transmitted from an engine to drive wheels in the drive-force transmitting system.

The output rotary member 24 corresponds to an output member of the automatic transmission 10, and serves as an output gear, i.e., a differential drive gear that meshes with a differential driven gear (large-diameter gear) 42, for transmitting a drive force to a differential gear device 40 that is shown in FIG. 3. FIG. 3 is a schematic view showing a main part of a control system provided in the vehicle 8 for controlling, for example, the automatic transmission 10 of FIG. 1, and also a drive-force transmitting system in which the drive force is to be transmitted from the engine 30 to drive wheels 46. The drive force as an output of the engine 30 is transmitted to the pair of drive wheels 46 via the automatic transmission 10, the differential gear device 40 and a pair of axles 44. It is noted that each of the automatic transmission 10 and the torque converter 32 is constructed substantially symmetrically about its axis C, so that a lower half of each of the automatic transmission 10 and the torque converter 32 is not shown in FIG. 1.

The torque converter 32 is provided with a lockup clutch 34 through which the drive force of the engine 30 is to be transmitted directly to the input shaft 22 without through a fluid. The lockup clutch 34 is a hydraulic friction clutch that is be engaged and released depending on a pressure difference $\Delta P$ between a hydraulic pressure in an engaging fluid chamber 36 and a hydraulic pressure in a releasing fluid chamber 38. With the lockup clutch 34 being fully engaged (lockup ON), the drive force of the engine 30 is transmitted directly to the input shaft 22. Further, the pressure difference $\Delta P$, i.e., a torque capacity of the lockup clutch 34, is subjected to a feedback control for causing the lockup clutch 34 to be placed in a slipping state, such that the turbine shaft (input shaft 22) is rotated together with rotation of an output rotary member (crank shaft) of the engine 30 with a given slip amount, namely, the turbine shaft is rotated at a rotational speed lower than a rotational speed of the output rotary member of the engine 30. A mechanical oil pump 28 is connected to the torque converter 32, so as to be mechanically rotated or driven by the engine 30.

The automatic transmission 10 is configured to establish a plurality of gear positions consisting of six forward gear positions (1st through 6th gear positions) and a reverse gear position R, depending on a state of connections among rotatory elements (sun gears S1-S3, carriers CA1-CA3, ring gears R1-R3) of the first and second transmission portions 14, 20. As shown in FIG. 2, regarding the six forward gear positions, the 1st gear position is established by engagements of the first clutch C1 and the second brake B2, the 2nd gear position is established by engagements of the first clutch C1 and the first brake B1, the 3rd gear position is established by engagements of the first clutch C1 and the third brake B3, the 4th gear position is established by engagements of the first clutch C1 and the second clutch C2, the 5th gear position is established by engagements of the second clutch C2 and the third brake B3, and the 6th gear position is established by engagements of the second clutch C2 and the first brake B1. Further, the reverse gear position R is established by engagements of the second brake B2 and the third brake B3. Moreover, with all of the clutches C1, C2 and the brakes B1-B3 being released, the automatic transmission 10 is placed in its neutral state in which transmission of the drive force is cut off.

The table of FIG. 2 indicates the relationship between each of the above-described gear positions and a combination of ones of the clutch C1, C2 and the brake B1-B3 that are to be engaged to establish the gear position in the automatic transmission 10. In the table, "O" indicates that the corresponding friction engagement device is placed in its engaged state, "□" indicates that the corresponding friction engagement device is placed in its engaged state during application of an engine brake to the vehicle 8, and blank indicates that the corresponding friction engagement device is placed in its released (disengaged) state. A one-way clutch F1 is disposed in parallel with the second brake B2 that is to be engaged to establish the 1st gear position during application of the engine brake to the vehicle 8. Therefore, when the vehicle 8 starts running (namely, when the vehicle 8 is accelerated), the first clutch C1 is placed in its engaged state without the second brake B2 being placed in its engaged state, for establishing the 1st gear position in the automatic transmission 10. When the engine brake is to be applied to the vehicle 8, the second brake B2 as well as the first clutch C1 is placed in its engaged state, for establishing the 1st gear position in the automatic transmission 10. A gear ratio γ (=input rotational speed ωi/output rotational speed ωo) of each gear position is determined depending on gear ratios (=number of teeth of sun gear/number of teeth of ring gear) ρ1, ρ2, ρ3 of the respective first, second and third planetary gear devices 12, 16, 18, such that the gear ratio γ of the 1st gear position is the highest while the gear ratio γ of the 6th gear position is the lowest, and such that the gear ratio γ is reduced as the gear position is switched from a lower-speed one to a higher-speed one. The input rotational speed ωi is the rotational speed of the input shaft 22, and is equal to a turbine rotational speed Nt. The output rotational speed ωo is the rotational speed of the output rotary member 24, and corresponds to a running speed V of the vehicle 8.

Thus, in the present embodiment, the automatic transmission 10 is configured to establish a selected one of the plurality of gear positions that provide respective different gear ratios γ, by engaging corresponding ones of the plurality of friction engagement devices that consist of the clutches C1, C2 and the brakes B1-B3. As is apparent from the table of FIG. 2, any one of the gear positions can be switched to the adjacent gear position, by so-called "clutch-to-clutch" shifting operation that is made by a releasing action of one of the clutches C1, C2 and the brakes B1-B3 and an engaging action of another one of the clutches C1, C2 and the brakes B1-B3. Each of the clutches C1, C2 and the brakes B1-B3 (hereinafter simply referred to as "clutches C and brakes B" unless they are to be distinguished from each other) is a hydraulic friction engagement device such as a multi-plate clutch or brake, which includes a hydraulic actuator that is to be controlled, so as to be selectively engaged and released. The engaged/released state of each of the clutches C and the brakes B is switched and a transition hydraulic pressure during the engaging or releasing action of each of the clutches C and the brakes B is controlled by an engaging hydraulic pressure supplied from a corresponding one of linear solenoid valves SL1-SL5 that are included in the hydraulic control unit 48 (see FIG. 3). Each of the linear solenoid valves SL1-SL5 corresponds to an engaging/releasing regulator valve, and is provided for a corresponding one of the clutches C1, C2 and the brakes B1-B3.

Figure 5:
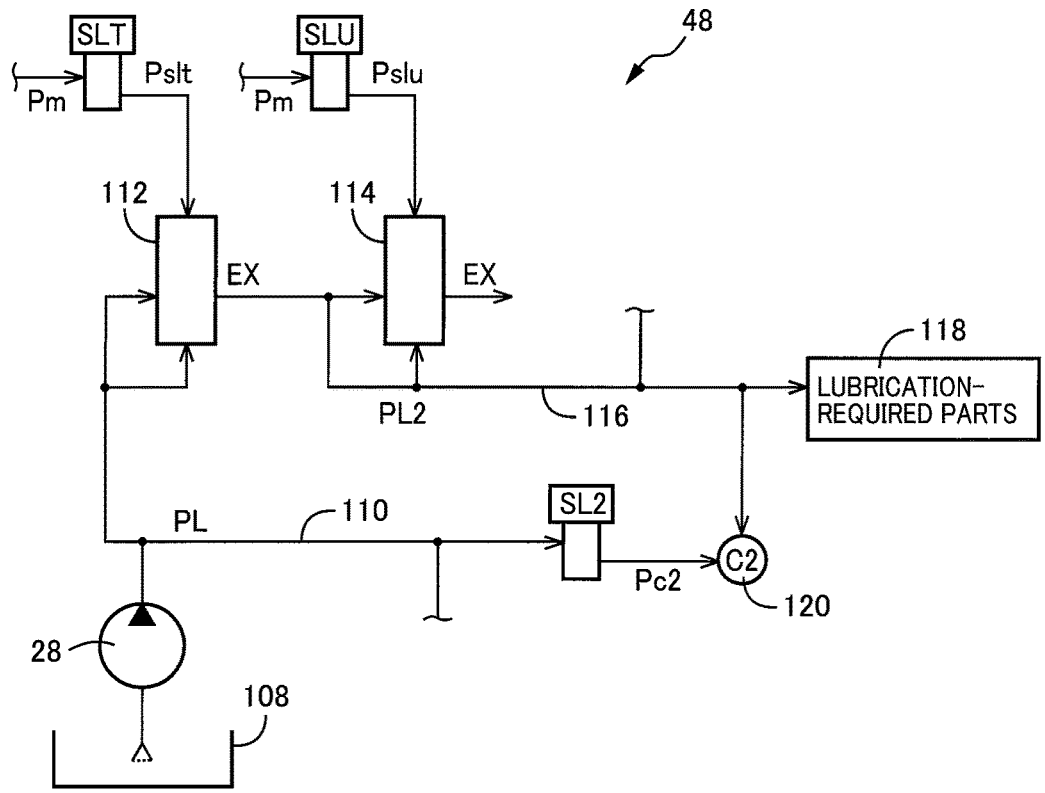
FIG. 5 is a hydraulic circuit diagram showing a main part of a hydraulic control unit included in the vehicle shown in FIG. 1.

FIG. 5 is a hydraulic circuit diagram for explaining a part of the hydraulic control unit 48, which relates to an engaging/releasing control operation performed for the second clutch C2. The hydraulic control unit 48 includes first and second line-pressure regulator valves 112, 114 to which a fluid pumped up from an oil storage 108 by the mechanical oil pump 28 that is to be rotated or driven by the engine 30. The first line-pressure regulator valve 112 is configured to regulate a hydraulic pressure of the fluid to a first line pressure PL. The second line-pressure regulator valve 114 is configured to regulate the hydraulic pressure of the fluid to a second line pressure PL2. Each of the first and second line-pressure regulator valves 112, 114 is a regulator valve having a relief function. The fluid pumped up by the mechanical oil pump 28 from the oil storage 108 is first supplied to the first line-pressure regulator valve 112 in which the hydraulic pressure of the fluid is regulated to the first line pressure PL, and the first line pressure PL is supplied through the first line-pressure passage 110 toward various parts. The fluid (relief fluid) relieved (discharged) by the first line-pressure regulator valve 112 is supplied to the second line-pressure regulator valve 114 in which the hydraulic pressure of the fluid is regulated to the second line pressure PL2, and the second line pressure PL2 is supplied through the second line-pressure passage 116 toward various parts. The hydraulic control unit 48 further includes electromagnetic pressure regulator valves SLT, SLU configured to supply signal pressures Pslt, Pslu to the respective first and second line-pressure regulator valves 112, 114, such that the first and second line pressures PL, 2PL are regulated based on the respective signal pressures Pslt, Pslu.

The electromagnetic pressure regulator valve SLT is configured to receive an original pressure in the form of a modulator pressure Pm that is substantially constant, and to regulate the modulator pressure Pm to the signal pressure Pslt, based on an engine load that is represented by, for example, an accelerator operation amount Acc representing a required output amount and a throttle-valve opening degree θth and a required drive force corresponding to an engine torque. Thus, the first line pressure PL is controlled to be increased and reduced by the signal pressure Pslu that is dependent on, for example, the engine load. The electromagnetic pressure regulator valve SLU is configured to receive the modulator pressure Pm, and to regulate the modulator pressure Pm to the signal pressure Pslu, such that the signal pressure Pslu has a selected one of two different pressure values which is selected based on, for example, the engine load such as the throttle-valve opening degree θth and an engine rotational speed Ne. When the engine rotational speed Ne is low, for example, upon starting of the engine 30, the second line pressure PL2 based on the signal pressure Pslu is made low whereby the fluid is outputted at a low flow rate through the second line-pressure passage 116. When the second line pressure PL2 is made high, for example, by increase of the engine rotational speed Ne, the fluid is outputted at a high flow rate through the second line-pressure passage 116. Although the two electromagnetic pressure regulator valves SLT, SLU are used in the present embodiment, the two electromagnetic pressure regulator valves SLT, SLU may be replaced by a common electromagnetic pressure regulator valve from which the same signal pressure is to be supplied to both of the first and second line-pressure regulator valves 112, 114. Moreover, each of the first and second line-pressure regulator valves 112, 114 may be replaced by an electromagnetic valve.

The first line-pressure passage 110 is provided with the above-described linear solenoid valves SL1-SL5, such that a hydraulic cylinder of each of the clutches C and the brakes B receives the engaging hydraulic pressure to which the first line pressure PL is regulated by a corresponding one of the linear solenoid valves SL1-SL5, and each of the clutches C and the brakes B is controlled, independently of the others of the clutches C and the brakes B, so as to be engaged or released based on the engaging hydraulic pressure supplied to the hydraulic cylinder. Meanwhile, the second line-pressure passage 116 is configured to deliver the fluid regulated to the second line pressure PL2, such that a part of the delivered fluid is supplied to various lubrication-required parts 118 while another part of the delivered fluid is supplied to a canceller chamber of the hydraulic cylinder of a corresponding one of the clutches C1, C2 that are to be rotated about the axis C of the automatic transmission 10. Further, still another part of the delivered fluid (that is regulated to the second line pressure PL2 and is delivered by the second line-pressure passage 116) is supplied to the torque converter 32. The lubrication-required parts 118 include friction engagement portions of the clutches C and the brakes B, meshing portions of gears and bearings. The fluid supplied to the lubrication-required parts 118 is returned, owing to its gravity flow, to the oil storage 108 such as an oil pan.

Figure 6:
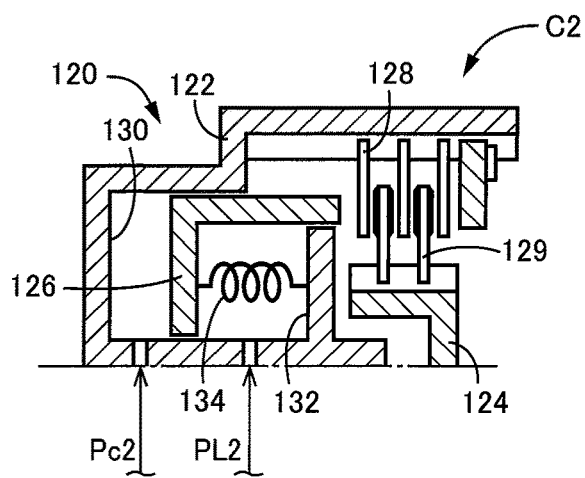
FIG. 6 is a schematic cross sectional view of a hydraulic cylinder of a second clutch included in the hydraulic control unit of FIG. 5.

In FIG. 5, reference sign "120" represents the hydraulic cylinder of the second clutch C2. The linear solenoid valve SL2 is configured to receive an original pressure in the form of the first line pressure PL and to regulate the first line pressure PL to a C2 engaging hydraulic pressure Pc2, which is to be supplied to the hydraulic cylinder 120 whereby the second clutch C2 is controlled to be engaged or released. To the hydraulic cylinder 120, the above-described another part of the fluid, which is regulated to the second line pressure PL2, is also supplied through the second line-pressure passage 116. FIG. 6 is a schematic cross sectional view showing a part (upper half) of the second clutch C2 including the hydraulic cylinder 120. The second clutch C2 includes first and second members 122, 124 that are rotatable relative to each other about a common axis (corresponding to the axis C shown in FIG. 1) such that the hydraulic cylinder 120 is provided integrally with the first member 122. The first member 122 is fixed integrally to the input shaft 22, such that the first member 122 and a piston 126 are to be rotated integrally with the input shaft 22. Meanwhile, the second member 124 is fixed integrally to ring gears R2, R3 of the respective second and third planetary gear devices 16, 18 (see FIG. 1). That is, the hydraulic cylinder 120, which is provided integrally with the first member 122, is to be rotated integrally with the input shaft 22. The second clutch C2 further includes a plurality of clutch plates (friction members) 128, 129 that are disposed between the first and second members 122, 124. The clutch plates 128, 129 are to be pressed by the piston 126 so as to be brought into friction engagement with each other whereby the first and second members 122, 124 are restrained from being rotated relative to each other.

The hydraulic cylinder 120 has a pressure chamber 130 and a canceller chamber 132 which are provided on respective opposite sides of the piston 126. The pressure chamber 130 is configured to receive the fluid for moving the piston 126 in a forward direction so as to cause the second clutch C2 to be frictionally engaged at a given engaging pressure, namely, is configured to receive the C2 engaging hydraulic pressure Pc2 to which the first line pressure PL as the original pressure is regulated by the second linear solenoid valve SL2. Meanwhile, the canceller chamber 132 is configured to receive the above-described another part of the fluid which has been regulated to the second line pressure PL2, so as to prevent dragging between the clutch plates 128, 129, which could be caused by movement of the piston 126 in the forward direction by a centrifugal hydraulic pressure generated in the fluid remaining in the pressure chamber 130 when the second clutch C2 is place in the released (disengaged) state. Although a return spring 134 is provided in the canceller chamber 132, the piston 126 could be moved in the forward direction thereby causing the dragging when a thrust force based on the centrifugal hydraulic pressure generated in the fluid remaining in the pressure chamber 130 is made larger than a biasing force of the return spring 134. It is noted that the hydraulic cylinder of the first clutch C1 is also influenced by the centrifugal hydraulic pressure so that the canceller chamber is provided in the hydraulic cylinder of the first clutch C1 as well as in the hydraulic cylinder 120 of the second clutch C2.

An electronic control apparatus 50 shown in FIG. 3 serves as a controller configured to perform various control operations such as a control for the output of the engine 30, a control for shifting of the automatic transmission 10 and a control for each of the electromagnetic pressure regulator valves SLT, SLU so as to regulate the hydraulic pressure in each of the first and second line pressures PL, PL2. The electronic control apparatus 50 includes a microcomputer incorporating a CPU, a ROM, a RAM and an input-output interface. The CPU performs the control operations, by processing various input signals, according to control programs stored in the ROM, while utilizing a temporary data storage function of the RAM. The electronic control apparatus 50 may be constituted by two or more control units exclusively assigned to perform the different control operations such as the control for the output of the engine 30 and the control for the shifting of the automatic transmission 10, i.e., controls for the linear solenoid valves SL1-SL5.

The electronic control apparatus 50 is configured to receive various data required to execute the various control operations. Specifically, the electronic control apparatus 50 receives: an output signal indicative of an accelerator operation amount Acc of an accelerator pedal 52, which is detected by an accelerator-operation amount sensor 54; an output signal indicative of an engine rotational speed Ne (rotational speed of the engine 30), which is detected by an engine speed sensor 56; an output signal indicative of an intake air quantity Q of air intaken into the engine 30, which is detected by an intake air sensor 60; an output signal indicative of an opening degree θth of an electronic throttle valve 62 of the engine 30, which is detected by a throttle-valve opening degree sensor 64; an output signal indicative of a running speed V of the vehicle 8, which is detected by a vehicle speed sensor 66; a brake ON signal Bon indicative of operation of a brake pedal 68, which is detected by a brake switch 70; an output signal indicative of an operation position (lever position) Psh of a shift lever 72, which is detected by a lever position sensor 74; and an output signal indicative of a turbine rotational speed Nt, which is detected by a turbine speed sensor 76. The running speed V corresponds to the output rotational speed ω that is the rotational speed of the output rotary member 24. The turbine rotational speed Nt is equal to the input rotational speed ωi that is the rotational speed of the input shaft 22. The brake ON signal Bon indicates that wheel brakes as service brakes are being operated in response to a depressing operation made on the brake pedal 68.

The shift lever 72 is disposed near an operator's seat in the vehicle 8, and is manually operable to be placed in a selected one of four shift-lever operating positions that consist of, for example, position "P", position "R", position "N" and position "D". When the shift lever 72 is placed in the position "P", a parking range is selected whereby the automatic transmission 10 is placed in a neutral state in which power transmission in the automatic transmission 10 is cut off with rotation of the output rotary member 24 being mechanically inhibited (locked) by a parking lock mechanism. When the shift lever 72 is placed in the position "R", a reverse running range is selected whereby the reverse gear position R is established in the automatic transmission 10 so as to enable the vehicle 8 to run in a reverse direction. When the shift lever 72 is placed in the position "N", a neutral range is selected whereby the automatic transmission 10 is placed in the neutral state in which the power transmission in the automatic transmission 10 is cut off. When the shift lever 72 is placed in the position "D", a forward running range is selected for executing an automatic shift control using all of the forward gear positions (consisting of the 1st through 6th gear positions), namely, executing an automatic shift control within a forward drive range within which the shifting of the automatic transmission 10 is allowed, so as to enable the vehicle 8 to run in a forward direction with a selected one of the forward gear positions being established in the automatic transmission 10. The shift-lever operating positions may include, in addition to the four positions, another position such as position "S" that causes a manual shift range (e.g., sequential range) to be selected for manually switching among the forward gear positions (consisting of the 1st through 6th gear positions).

The electronic control apparatus 50 is further configured to output various signals such as a throttle drive signal for controlling the throttle-valve opening degree θth of the electronic throttle valve 62, an ignition signal for controlling an ignition timing of the engine 30, a fuel supply amount signal for controlling an amount of fuel supplied to the engine 30 from a fuel injection device 78, a shift command signal for controlling the linear solenoid valves SL1-SL5 of the hydraulic control unit 48 so as to switch the gear position established in the automatic transmission 10, and a regulation command signal for controlling each of the electromagnetic pressure regulator valves SLT, SLU by which the first and second line pressures PL, PL2 are regulated.

The electronic control apparatus 50 functionally includes an engine control portion 80, a transmission-shifting control portion 82, an engine automatic-stop controlling portion 84 and an input-rotation limiting portion 86. The engine control portion 80 is configured to control basically the electronic throttle valve 62 and the fuel injection device 78 such that the engine 30 generates a required output that is calculated based on the required output amount represented by, for example, the accelerator operation amount Acc. The transmission-shifting control portion 82 is configured to control the shifting of the automatic transmission 10, when the forward running range is selected with the shift lever 72 being placed in the position "D". With the shifting of the automatic transmission 10 being controlled, the automatic shift control is performed by using all of the forward gear positions (consisting of the 1st through 6th gear positions), such that a selected one of the forward gear positions is established, wherein the selected one is selected in accordance with a predetermined shift map (shift conditions) based on parameters in the form of an operation sate of the vehicle 8 that is represented by, for example, the running speed V and the accelerator operation amount Acc. The engine automatic-stop controlling portion 84 is configured to execute an engine automatic-stop control. During execution of the engine automatic-stop control, the engine automatic-stop controlling portion 84 causes the operation of the engine 30 to be automatically stopped, by, for example, a fuel cut for stopping the fuel injection made by the fuel injection device 78 when the vehicle 8 is being stopped and the forward running range is selected with the shift lever 72 being placed in the position "D", and causes the engine 30 to be automatically restarted when engine-restart conditions are satisfied, wherein the engine-restart conditions include a condition that the depression of the brake pedal 68 is released and a condition that the accelerator pedal 52 is depressed. This engine automatic-stop control is referred also to as "S & S (stop and start) control" and "idling stop control".

During execution of the engine automatic-stop control, when the engine 30 is automatically stopped by the engine automatic-stop controlling portion 84, the rotation or operation of the mechanical oil pump 28 is stopped as a result of the automatic stop of the engine 30, whereby the first and second liner pressures PL, PL2 are stopped to be outputted. Therefore, the fluid in the canceller chamber 132 of the hydraulic cylinder 120 of the second clutch C2 is caused to flow out to the second line passage 116 that is connected to the canceller chamber 132. Since the second line-pressure passage 116 is exposed to an atmosphere via, for example, the lubrication-required parts 118, the fluid in the canceller chamber 132 is relatively quickly caused to flow out to the second line-pressure passage 116 when the second line pressure PL2 is stopped to be outputted. On the other hand, to the pressure chamber 130 of the hydraulic cylinder 120, the fluid regulated by the linear solenoid valve SL2 is supplied, so that the fluid in the pressure chamber 130 is limited, by the linear solenoid valve SL2, from flowing out from the pressure chamber 130 even when the first line pressure PL is stopped to be outputted. Therefore, in a state shortly after the restart of the engine 30 in which the amount of supply of the fluid from the mechanical oil pump 28 is still small, if the hydraulic cylinder 120 of the second clutch C2, which is commanded to be released, is rotated at a high speed by a sudden start acceleration of the vehicle 8, a large forward thrust force is generated by the centrifugal hydraulic pressure of a relatively large amount of the fluid remaining in the pressure chamber 130, while a small reverse thrust force is generated by the centrifugal hydraulic pressure of a relatively small amount of the fluid remaining in the canceller chamber 132, so that a piston pressing force Fp acts on the piston 126 whereby the dragging is caused in the second clutch C2 and accordingly burnout could be caused in the second clutch C2. When the vehicle 8 starts running, in general, the 1st gear position is established in the automatic transmission 10 so that the second clutch C2 is a released engagement device that is commanded to be released.

Figure 4:
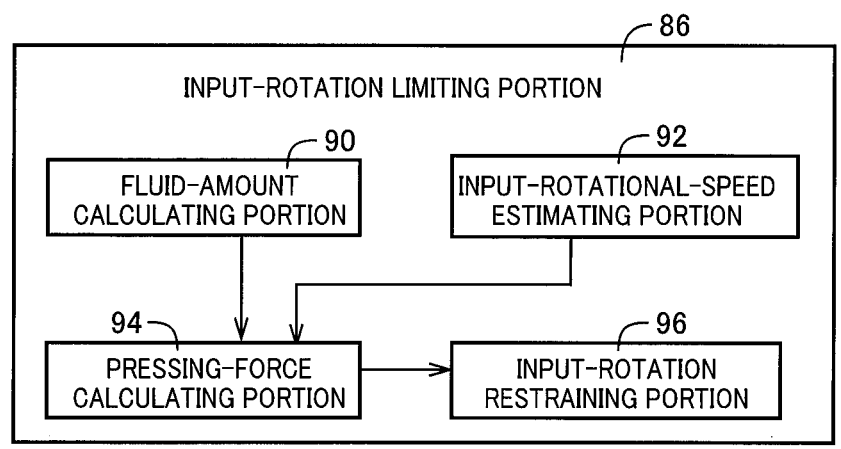
FIG. 4 is a block diagram showing functions included in an input-rotation limiting portion of the electronic control apparatus shown in FIG. 3.

On the other hand, in the present embodiment, the input-rotation limiting portion 86 is provided to restrain an increase of the input rotational speed ωi that corresponds to the rotational speed of the input rotational speed ωi, so as to limit the piston pressing force Fp in the second clutch C2 as the released engagement device upon start acceleration of the vehicle 8 shortly after the engine 30 is returned from the engine automatic stop and is restarted by the engine automatic-stop controlling portion 84. As shown in FIG. 4, the input-rotation limiting portion 86 functionally includes a fluid-amount calculating portion 90, an input-rotational-speed estimating portion 92, a pressing-force calculating portion 94 and an input-rotation restraining portion 96. The fluid-amount calculating portion 90 is configured to execute a control routine (signal processing) by implementing steps S1 through S9 as shown in flow chart of FIG. 7. Further, the input-rotational-speed estimating portion 92, the pressing-force calculating portion 94 and the input-rotation restraining portion 96 cooperate to execute a control routine (signal processing) by implementing steps R1 through R9 as shown in flow chart of FIG. 8. FIG. 9 is a time chart showing, by way of example, changes of operation states of respective various parts during executions of control operations, which are executed as shown in the flow charts of FIGS. 7 and 8, for restraining the increase of the input rotational speed $\omega i$ of the automatic transmission 10. In the control routine shown by the flow chart of FIG. 8, steps R2 and R3 are implemented by the input-rotational-speed estimating portion 92, steps R4 and R5 are implemented by the pressing-force calculating portion 94, and steps R6 and R7 are implemented by the input-rotation restraining portion 96. In the present embodiment, the electronic control apparatus 50, which functionally includes the input-rotation limiting portion 86, corresponds to a control apparatus for the vehicle 8.

Figure 7:
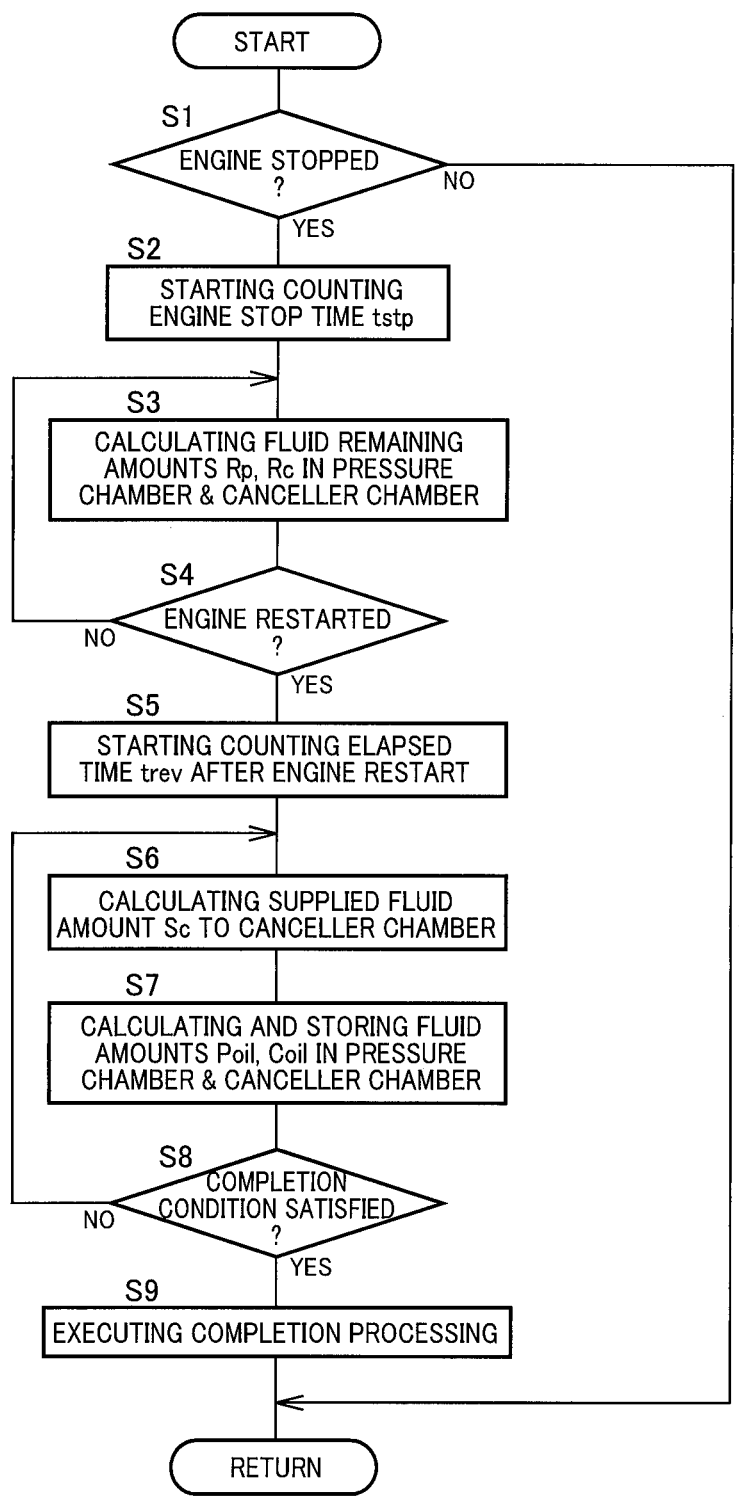
FIG. 7 is a flow chart showing signal processing operations performed by a fluid-amount calculating portion of the input-rotation limiting portion of FIG. 4.

In the control routine shown in the flow chart of FIG. 7, which is executed by the fluid-amount calculating portion 90, step S1 is first implemented to determine whether the engine 30 has been automatically stopped by the engine automatic-stop controlling portion 84, namely, determine whether the supply of the fluid has been stopped by stop of the rotation or operation of the mechanical oil pump 28. When the engine 30 has been automatically stopped, step S2 and the subsequent steps are implemented. When the engine 30 is being operated, namely, when a negative determination is made at step S1, one cycle of execution of the control routine is completed. Step S2 is implemented to start a counter that measures an engine stop time tstp for which the engine 30 has been stopped. Step S3 is implemented to calculate a fluid remaining amount Rp in the pressure chamber 130 and a fluid remaining amount Rc in the canceller chamber 132, based on the engine stop time tstp (e.g., seconds) measured at step S2, in accordance with respective expressions (1), (2) given below. In the expressions (1), (2), "Qp" and "Qc" represent volumes of the respective pressure chamber 130 and canceller chamber 132 when the piston 126 is positioned in its reverse end position, and "Fdp" and "Fdc" represent flow-out rates (e.g., cc/sec) of the fluid. The second clutch C2 had been placed in its released state before the engine 30 has been stopped, so that the engaging hydraulic pressure Pc2 is zero. However, until the engine 30 is stopped, the first line pressure PL is applied to the linear solenoid valve SL2 and the pressure chamber 130 is held filled with the fluid. Then, after the first line pressure PL is stopped to be outputted, the fluid remaining amount in the pressure chamber 130 is gradually reduced at the flow-out rate Fdp. This flow-out rate Fdp is lower than the flow-out rate Fdc that is a rate of flow out of the fluid from the canceller chamber 132 to the second line-pressure passage 116. It is noted that, where the flow-out rate Fdp is a low enough to be ignorable, it may be regarded that the fluid remaining amount Rp is equal to the volume Qp of the pressure chamber 130 (Rp=Qp). Further, each of the fluid remaining amounts Rp, Rc may be calculated in accordance with a predetermined map based on parameters in the form of the engine stop time tstp.

$$Rp=Qp-Fdp \cdot tstp \quad (1)$$

$$Rc=Qc-Fdc \cdot tstp \quad (2)$$

Then, step S4 is implemented to determine whether the engine 30 has been restarted, namely, whether the fluid has become to be supplied with the mechanical oil pump 28 being rotated or driven. Until the engine 30 is restarted, step S3 is repeatedly implemented whereby the fluid remaining amounts Rp, Rc are updated in accordance with the above expressions (1), (2). When the engine 30 is restarted, step S5 and the subsequent steps are implemented. In the time chart of FIG. 9, a time t1 is a point of time at which the engine 30 is automatically stopped by the engine automatic-stop control executed by the engine automatic-stop controlling portion 84, and a time t2 is a point of time at which the engine 30 is returned from the engine automatic stop and is restarted after having been stopped. Thus, a length of time from the time t1 to the time t2 is the engine stop time tstp. This time chart shows a case in which the engine 30 is restarted in response to a depression releasing operation (OFF operation) to the brake pedal 68. In FIG. 9, "1", "2" and "3" in "GEAR POSITION COMMAND VALUE" represent the 1st gear position, the 2nd gear position and the 3rd gear position, respectively. Further, "LUBRICATION OIL SUPPLY MODE" indicates a state of output of the fluid that is to be supplied through the second line-pressure passage 116 to the lubrication-required parts 118, and "LARGE" and "SMALL" represents large and small flow rates of the fluid, respectively. The "LUBRICATION OIL SUPPLY MODE" is to be switched by the second line-pressure regulator valve 114.

Then, step S5 is implemented to start a counter that measures an elapsed time trey after start of the engine 30. Step S5 is followed by step S6 that is implemented to calculate a supplied fluid amount Sc of the fluid supplied to the canceller chamber 132, in accordance with expression (3) given below, based on the elapsed time trey (e.g., seconds). In the expression (3), "Fsc" represents a supply rate (e.g., cc/sec) of the fluid. In the present embodiment, the supply rate of the fluid (lubrication oil) through the second line-pressure passage 116 is changed between two levels by the second line-pressure regulator valve 114, and the fluid is supplied at a flow rate that is increased with, for example, the increase of the engine rotational speed Ne, so that the supply rate Fec is also a variable. It is noted that the supplied fluid amount Sc may be calculated by using a predetermined map defining a relationship between the elapsed time trey as a parameter and the supplied fluid amount Sc.

$$Sc=Fsc \cdot trev \quad (3)$$

Then, step S7 is implemented to calculate a pressure-chamber-side fluid amount Poil that is an amount of the fluid in the pressure chamber 130 and a canceller-chamber-side fluid amount Coil that is an amount of the fluid in the canceller chamber 132, in accordance with expressions (4), (5) given below, and to store or memorize the calculated pressure-chamber-side fluid amount Poil and canceller-chamber-side fluid amount Coil. At this step S7, the canceller-chamber-side fluid amount Coil is obtained by adding the supplied fluid amount Sc to the fluid remaining amount Rc. Meanwhile, regarding the pressure-chamber-side fluid amount Poil, it is regarded that the amount of the fluid in the pressure chamber 130 remains unchanged in spite of the restart of the engine 30, and that the fluid remaining amount Rp is equal to the pressure-chamber-side fluid amount Poil. However, where the fluid is supplied to the pressure chamber 130 as a result of the restart of the engine 30, this step S7 may be modified such that a supplied fluid amount Sp of the fluid supplied to the pressure chamber 130 is calculated and the pressure-chamber-side fluid amount Poil is obtained by adding the supplied fluid amount Sp to the fluid remaining amount Rp. On the contrary, where the fluid is caused to further flow out of the pressure chamber 130, this step S7 may be modified such that the pressure-chamber-side fluid amount Poil is obtained by subtracting, from the fluid remaining amount Rp, an amount of the fluid flowing out of the pressure chamber 130.

$$Poil=Rp \quad (4)$$

$$Coil=Rc+Sc \quad (5)$$

Then, step S8 is implemented to determine whether a predetermined completion condition is satisfied. The completion condition may be that the canceller chamber 132 is considered to be sufficiently filled with the fluid such as a case in which a given length of time has elapsed after the start of the engine 30 and a case in which the engine rotational speed Ne has reached at least a given speed value. Until the completion condition is satisfied, step S6 and the subsequent steps are repeatedly implemented whereby the supplied fluid amount Sc is updated in accordance with the above expression (3) and the pressure-chamber-side fluid amount Poil and the canceller-chamber-side fluid amount Coil are updated in the accordance with the above expressions (4), (5) so as to be stored or memorized. When the completion condition is satisfied, the control flow goes to step S9 that is implemented to carry out a completion processing such as resetting of the counter, and then one cycle of execution of the control routine (for calculating the fluid amounts) is completed.

Figure 8:
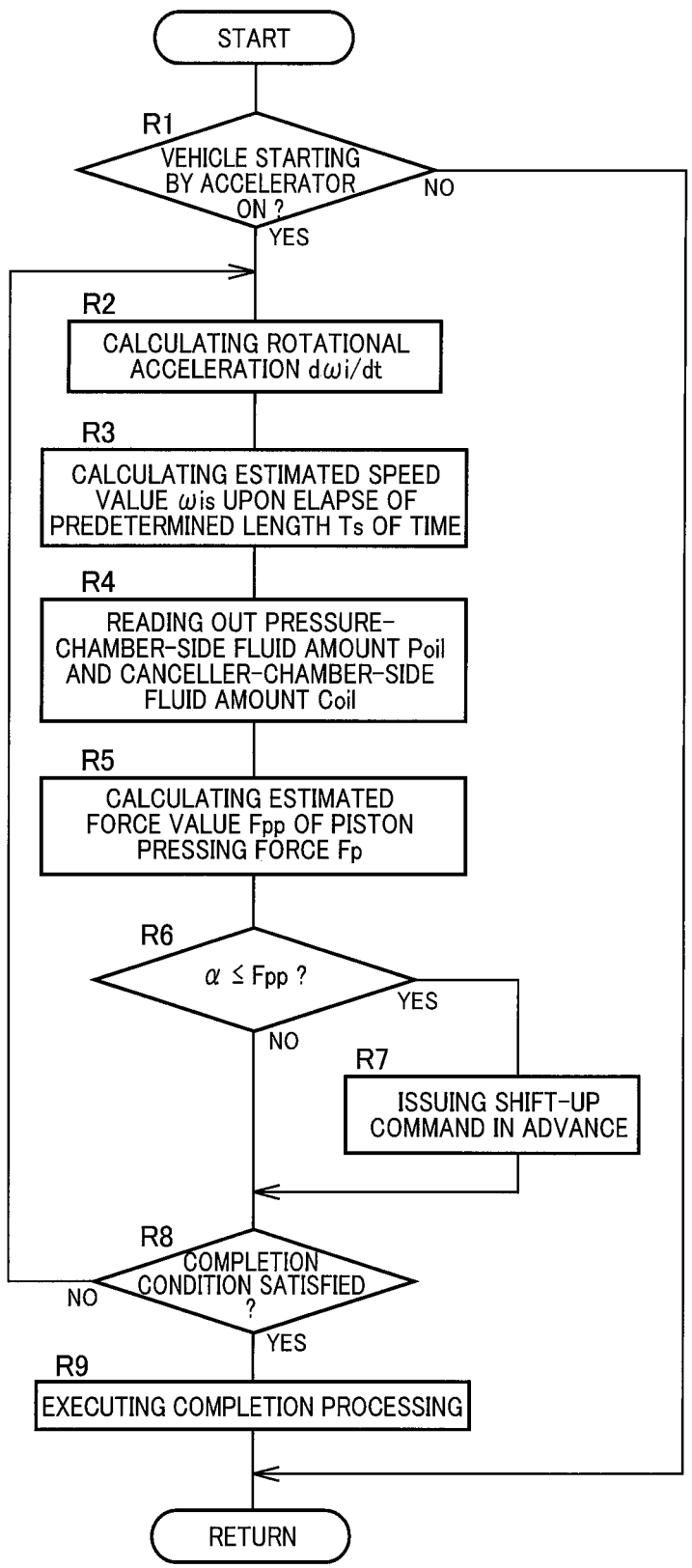
FIG. 8 is a flow chart showing signal processing operations performed by other portions of the input-rotation limiting portion of FIG. 4, which are other than the fluid-amount calculating portion.
Figure 9:
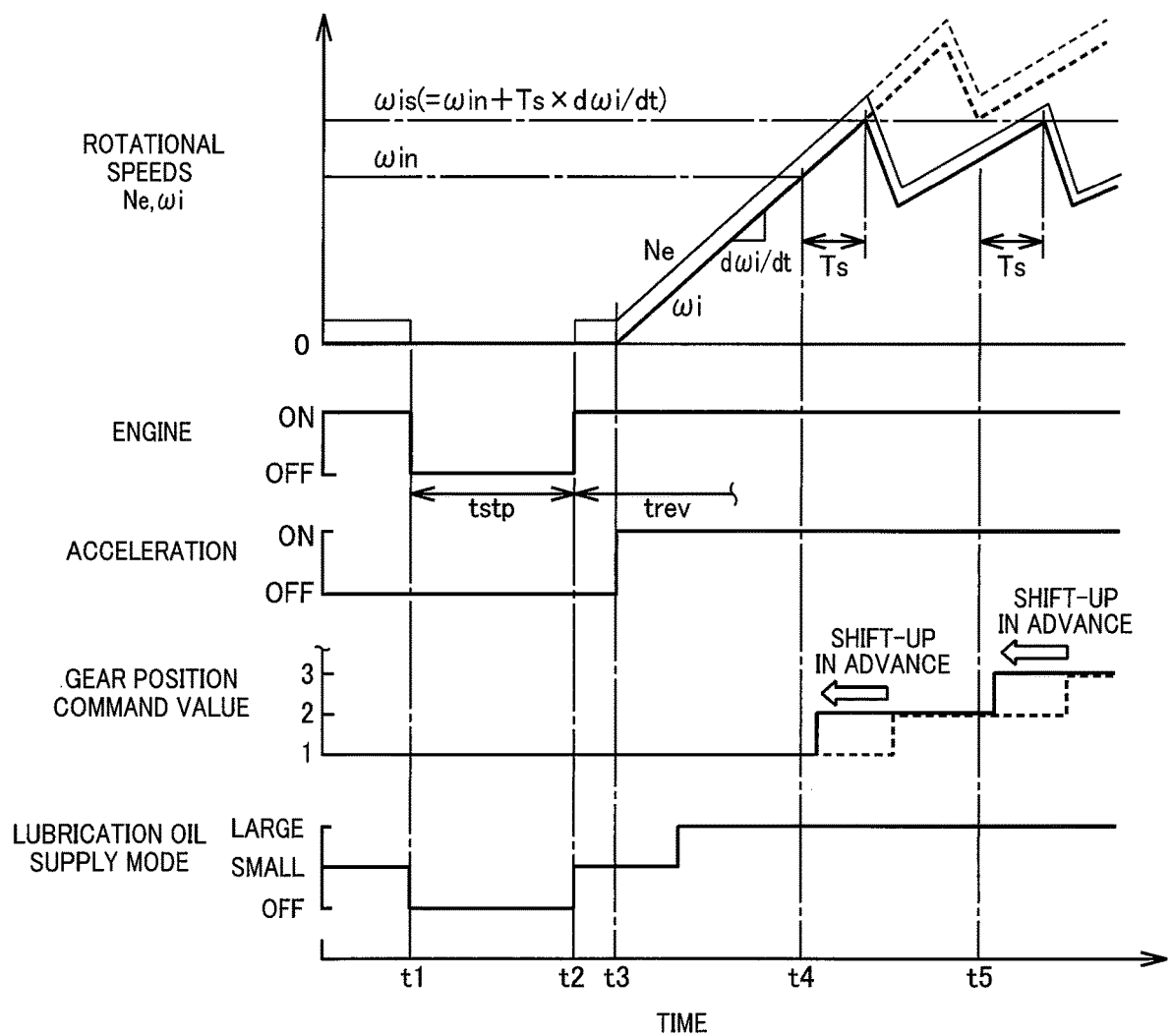
FIG. 9 is a time chart showing, by way of example, changes of operation states of respective various parts during executions of control operations, which are executed as shown in the flow charts of FIGS. 7 and 8, when the vehicle starts running and is accelerated, for restraining an increase of an input rotational speed of the automatic transmission of FIG. 1.

On the other hand, in the control routine shown in the flow chart of FIG. 8, which is executed by the input-rotational-speed estimating portion 92, the pressing-force calculating portion 94 and the input-rotation restraining portion 96, step R1 is first implemented to determine whether the vehicle 8 is starting by an accelerator ON with the accelerator pedal 52 being depressed after the engine 30 had been automatically stopped by the engine automatic-stop controlling portion 84. When it is determined at step R1 that the vehicle 8 is not starting by the accelerator ON, one cycle of execution of the control routine is completed. When it is determined at step R1 that the vehicle 8 is starting by the accelerator ON, step R2 and the subsequent steps are implemented. At step R2, a time derivative of the input rotational speed ωi, i.e., a rotational acceleration dωi/dt of the input shaft 22, is calculated. Then, step R3 is implemented to calculate an estimated speed value ωis that is a speed value of the input rotational speed ωi upon elapse of a predetermined length Ts of time from a current point of time, based on a current speed value ωin of the input rotational speed ωi and the rotational acceleration dωi/dt, in accordance with expression (6) given below. In FIG. 9, a time t3 is a point of time at which the accelerator pedal 52 is depressed.

$$\omega is=\omega in+Ts \cdot d\omega i/dt \quad (6)$$

Then, step R4 is implemented to read out the pressure-chamber-side fluid amount Poil and the canceller-chamber-side fluid amount Coil that have been calculated in the control routine shown in the flow chart of FIG. 7. Step R4 is followed by step R5 that is implemented to calculate an estimated force value Fpp (that is a force value of the piston pressing force Fp upon the elapse of the predetermined length Ts of time), in accordance with expression (7) given below, based on the pressure-chamber-side fluid amount Poil, the canceller-chamber-side fluid amount Coil, the estimated speed value ωis and a biasing force Fs of the return spring 134. In expression (7), "Ff" represents a forward thrust force which is based on the centrifugal hydraulic pressure in the pressure chamber 130 and which acts on the piston 126 in the forward direction, and can be obtained through, for example, a predetermined map or equation with parameters in the form of the pressure-chamber-side fluid amount Poil and the estimated speed value ωis. Further, in expression (7), "Fr" represents a reverse thrust force which is based on the centrifugal hydraulic pressure in the canceller chamber 132 and which acts on the piston 126 in the reverse direction, and can be obtained through, for example, a predetermined map or equation which parameters in the form of the canceller-chamber-side fluid amount Coil and the estimated speed value ωis. The forward thrust force Ff corresponds to the centrifugal hydraulic pressure of the fluid in the pressure chamber 130. The reverse thrust force Fr corresponds to the centrifugal hydraulic pressure of the fluid in the canceller chamber 132.

$$Fpp=Ff(Poil,\omega is)-Fr(Coil,\omega is)-Fs \quad (7)$$

Then, step R6 is implemented to determine whether the estimated force value Fpp is not smaller than a predetermined threshold α. When the estimated force value Fpp is smaller than the predetermined threshold α (Fpp<α), step R6 is followed immediately by step R8. When the estimated force value Fpp is not smaller than the predetermined threshold α (α≤Fpp), step R8 is implemented after step R7 that is implemented to issue a shift-up command in advance. That is, when the estimated force value Fpp is not smaller than the predetermined threshold α, there is a risk that the second clutch C2 could be dragged if the piston pressing force Fp is increased to the estimated force value Fpp (≥α) with increase of the input rotational speed ωi. Therefore, at step R7 that is implemented when the estimated force value Fpp is not smaller than the predetermined threshold α, the shift-up command is issued in advance whereby a shift up is done in the automatic transmission 10, for thereby restraining the increase of the input rotational speed ωi, namely, restraining the increase of the piston pressing force Fp due to the increase of the centrifugal hydraulic pressure. The predetermined threshold α is set to a value that makes it possible to restrain the increase of the input rotational speed ωi before the second clutch C2 is dragged, and is preferably set to a value in the vicinity of zero, for example. The predetermined threshold α may be set to a negative value, for more reliably preventing the dragging. In FIG. 9, each of times t4, t5 is a point of time at which the estimated force value Fpp becomes not smaller than the predetermined threshold α (α≤Fpp) and accordingly the determination at step R6 becomes affirmative (YES) whereby step R7 is implemented to issue the shift-up command in advance. In column of "ROTATIONAL SPEEDS" of FIG. 9, broken lines represent speed values of the engine rotational speed Ne and the input rotational speed ωi in an arrangement in which the shift-up command is not issued in advance. In the arrangement without the shift-up command issued in advance, there is a possibility that the second clutch C2 could be dragged when the input rotational speed ωi is increased to exceed the estimated speed value ωis that causes the estimated force value Fpp be not smaller than the predetermined threshold α. It is noted that, in the example shown in FIG. 9, at the times t4, t5, the estimated force value Fpp becomes not smaller than the predetermined threshold α, with the same estimated speed value ωis, whereby the shift-up command is issued in advance. However, more precisely, the estimated speed value ωis, which causes the estimated force value Fpp be not smaller than the predetermined threshold α, is gradually increased with elapse of time because the reverse thrust force Fr is increased with increase of the canceller-chamber-side fluid amount Coil with the elapse of time.

Then, step R8 is implemented to determine whether a predetermined completion condition is satisfied, as step S8 in the above-described control routine shown in the flow chart of FIG. 7. Until the completion condition is satisfied, step R2 and the subsequent steps are repeatedly implemented. When the completion condition is satisfied, the control flow goes to step R9 that is implemented to carry out a completion processing, and then one cycle of execution of the control routine (for limiting the input rotation upon starting of the vehicle running) is completed.

As described above, in the vehicle 8 according to the present embodiment, when the vehicle 8 is started with the accelerator pedal 52 being depressed after the engine 30 is returned from the engine automatic stop by the engine automatic-stop control so as to be restarted, the estimated speed value ωis (that is the speed value of the input rotational speed ωi upon elapse of the predetermined length Ts of time) is calculated. Further, the estimated force value Fpp (that is the force value of the piston pressing force Fp acting on the piston 126 in the forward direction in the second clutch C2 as the released engagement device upon the elapse of the predetermined length Ts of time) is calculated based on the forward thrust force Ff (i.e., the centrifugal hydraulic pressure of the fluid in the pressure chamber 130 of the second clutch C2) and the reverse thrust force Fr (i.e., the centrifugal hydraulic pressure of the fluid in the canceller chamber 132 of the second clutch C2) that are dependent on the estimated speed value ωis. When the estimated force value Fpp is not smaller than the predetermined threshold α, the increase of the input rotational speed ωi is retrained by shifting up the automatic transmission 10 in advance, so that it is possible to restrain the increase of the rotational speed of the hydraulic cylinder 120 of the second clutch C2, and accordingly to restrain the increase of the piston pressing force Fp based on the difference between the centrifugal hydraulic pressure of the fluid in the pressure chamber 130 of the hydraulic cylinder 120 and the centrifugal hydraulic pressure of the fluid in the canceller chamber 132 of the hydraulic cylinder 120. Thus, when the vehicle 8 starts running and is accelerated shortly after the start of the engine 30 as the drive force source, it is possible to restrain the piston pressing force Fp from being increased to exceed the predetermined threshold α due to shortage of the fluid in the canceller chamber 132, and accordingly to restrain the second clutch C2 from being dragged due to the increase of the piston pressing force Fp.

There is further provided the engine automatic-stop controlling portion 84 that is configured, when the vehicle 8 is stopped, to cause the engine 30 as the drive force source to be automatically stopped. In general, there is a higher probability that the vehicle 8 is caused to start and to be accelerated immediately after the engine 30 is started, when the engine 30 is started after having been returned from the engine automatic stop, than when the engine 30 is started not after having been returned from the engine automatic stop. That is, in a stage in which the amount of the fluid supplied from the mechanical oil pump 28 is still small, the hydraulic cylinder 120 could be rotated at a high speed by a sudden start acceleration of the vehicle 8, whereby the piston pressing force Fp could be increased due to shortage of the fluid in the canceller chamber 132, so that the dragging could be caused in the second clutch C2. However, in the present embodiment, the estimated force value Fpp is calculated based on the forward thrust force Ff (i.e., the centrifugal hydraulic pressure of the fluid in the pressure chamber 130) and the reverse thrust force Fr (i.e., the centrifugal hydraulic pressure of the fluid in the canceller chamber 132) that are dependent on the estimated speed value ωis, and the increase of the input rotational speed ωi is restrained when the estimated force value Fpp is not smaller than the predetermined threshold α. Thus, when the vehicle 8 starts running and is accelerated shortly after the engine 30 has been returned from the engine automatic stop, it is possible to appropriately restrain the second clutch C2 from being dragged due to shortage of the fluid in the canceller chamber 132.

Further, the hydraulic cylinder 120 of the second clutch C2 is connected to the input shaft 22 of the automatic transmission 10, so as to be rotated at the rotational speed that is equal to the input rotational speed ωi. The electronic control apparatus 50 is configured, when the estimated force value Fpp is not smaller than the predetermined threshold α, to restrain the increase of the input rotational speed ωi by shifting up the automatic transmission 10 in advance. Thus, the increase of the rotational speed of the hydraulic cylinder 120 of the second clutch C2 as well as the increase of the input rotational speed ωi is reliably restrained, so that it is possible to appropriately restrain the second clutch C2 from being dragged due to the increase of the centrifugal hydraulic pressure which could be caused by the increase of the rotational speed of the hydraulic cylinder 120.

Further, the fluid remaining amount Rc of the fluid remaining in the canceller chamber 132 is calculated based on the engine stop time tstp, and the supplied fluid amount Sc of the fluid supplied to the canceller chamber 132 is calculated based on the elapsed time trey that is the length of time that elapsed from the start of the mechanical oil pump 28, so as to obtain the canceller-chamber-side fluid amount Coil. Further, the reverse thrust force Fr is calculated based on the estimated speed value ωis and the canceller-chamber-side fluid amount Coil, and the estimated force value Fpp is obtained by subtracting the reverse thrust force Fr from the forward thrust force Ff. Thus, the estimated force value Fpp can be obtained with a high accuracy, so that it is possible to appropriately restrain the second clutch C2 from being dragged, and also to restrain reduction of a start acceleration performance of the vehicle 8, which could be caused if the increase of the input rotational speed ωi were limited more than necessary.

Further, the fluid remaining amount Rp of the fluid remaining in the pressure chamber 130 is calculated based on the engine stop time tstp, and the calculated fluid remaining amount Rp is regarded as the pressure-chamber-side fluid amount Poil. Then, the forward thrust force Ff is calculated based on the pressure-chamber-side fluid amount Poil and the estimated speed value ωis, namely, based on the fluid remaining amount Rp and the estimated speed value ωis Thus, the estimated force value Fpp can be obtained with a further high accuracy, so that it is possible to appropriately restrain the second clutch C2 from being dragged, and also to restrain reduction of the start acceleration performance of the vehicle 8, which could be caused if the increase of the input rotational speed ωi were limited more than necessary.

Further, the hydraulic control unit 48 includes the first line-pressure regulator valve 112 having the relief function and the linear solenoid valve SL2, wherein the first line-pressure regulator valve 112 is configured to regulate the hydraulic pressure in the first line-pressure passage 110, to the first line pressure PL, such that the relief fluid is supplied from the first line-pressure regulator valve 112 to the canceller chamber 132 and the lubrication-required parts 118, and wherein the linear solenoid valve SL2 is configured to receive the first line pressure PL, such that the fluid regulated by the linear solenoid valve SL2 is supplied to the pressure chamber 130. In this arrangement, when the supply of the fluid is stopped together with the engine stop by execution of the engine automatic-stop control, the fluid is caused to rapidly flow out of the canceller chamber 132 that is exposed to the atmosphere through, for example, the lubrication-required parts 118, so that the second clutch C2 could be dragged due to the fluid flow out of the canceller chamber 132 when the vehicle 8 starts running and is accelerated. Thus, in this arrangement, which could suffer from the dragging in the second clutch C2, the advantage provided by the present invention is effective, wherein the advantage is to reliably restrain the second clutch C2 from being dragged due to shortage of the fluid in the canceller chamber 132, by calculating the estimated force value Fpp and restraining the increase of the input rotational speed ωi in a case in which the estimated force value Fpp is not smaller than the predetermined threshold α.

Further, the hydraulic control unit 48 further includes the second line-pressure regulator valve 114 that is connected to the second line-pressure passage 116 to which the relief fluid is relieved by the first line-pressure regulator valve 112 is supplied. The second line-pressure regulator valve 114 is configured to regulate the hydraulic pressure in the second line-pressure passage 116, to the second line pressure PL2, by relieving the part of the relief fluid from the second line-pressure passage 116, such that the second line pressure PL2 is changed between the two levels, depending on, for example, the engine rotational speed Ne. When the engine 30 is started, for example, the second line pressure PL2 is placed in a lower one of the two levels whereby that the flow rate of the fluid supplied to the canceller chamber 132 and the lubrication-required parts 118 through the second line-pressure passage 116 is reduced. In this arrangement, the fluid is supplied to the lubrication-required parts 118 at a minimally required rate whereby a fuel economy of the vehicle 8 is improved, but there is a possibility that the second clutch C2 could be dragged due to shortage of the fluid in the canceller chamber 132 upon running start and acceleration of the vehicle 8 since the flow rate of the fluid supplied to the canceller chamber 132 through the second line-pressure passage 116 is low for a while after starting of the mechanical oil pump 28. Thus, in this arrangement, which could suffer from the dragging in the second clutch C2, the advantage provided by the present invention is effective, wherein the advantage is to restrain the second clutch C2 from being dragged due to shortage of the fluid in the canceller chamber 132, by calculating the estimated force value Fpp and restraining the increase of the input rotational speed ωi in a case in which the estimated force value Fpp is not smaller than the predetermined threshold α.

Figure 10:
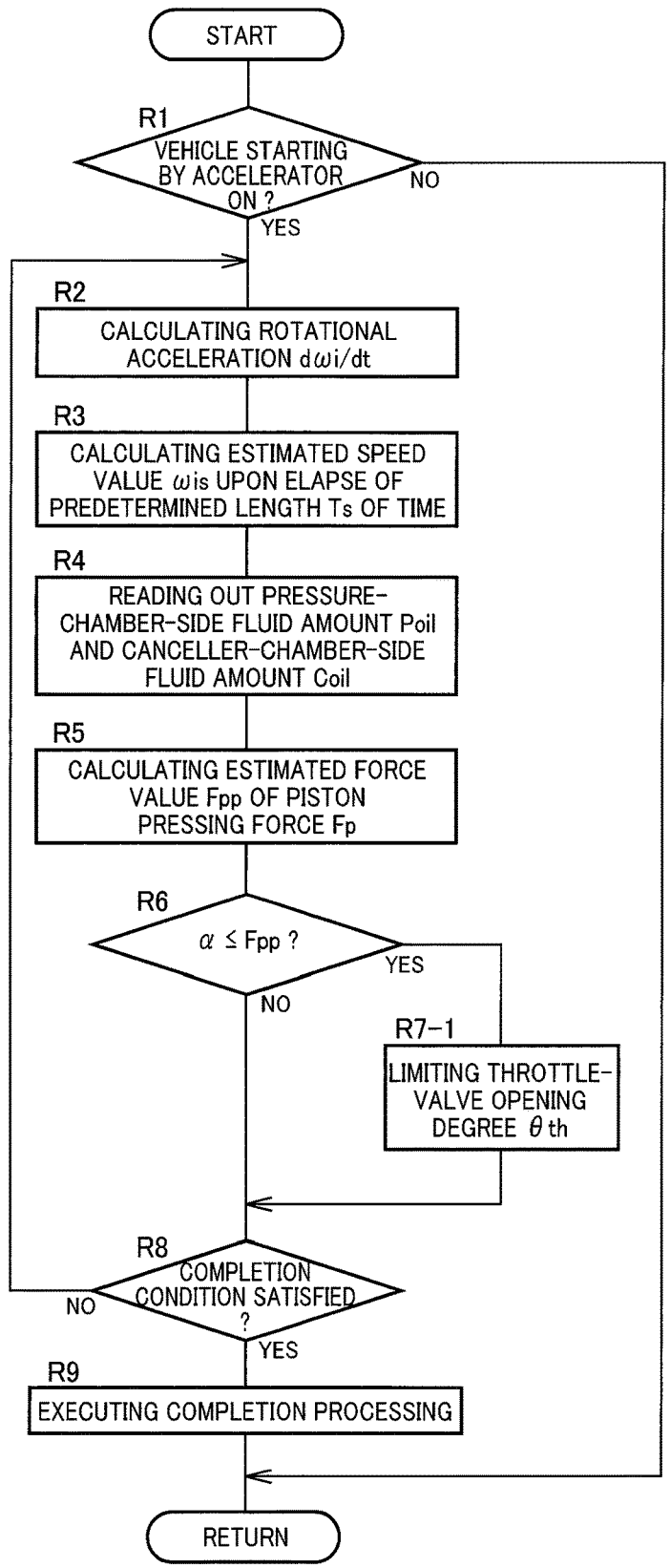
FIG. 10 is a flow chart showing signal processing operations performed by the input-rotation limiting portion of FIG. 4, wherein the signal processing operations are different from the signal processing operations shown by the flow chart of FIG. 8.
Figure 11:
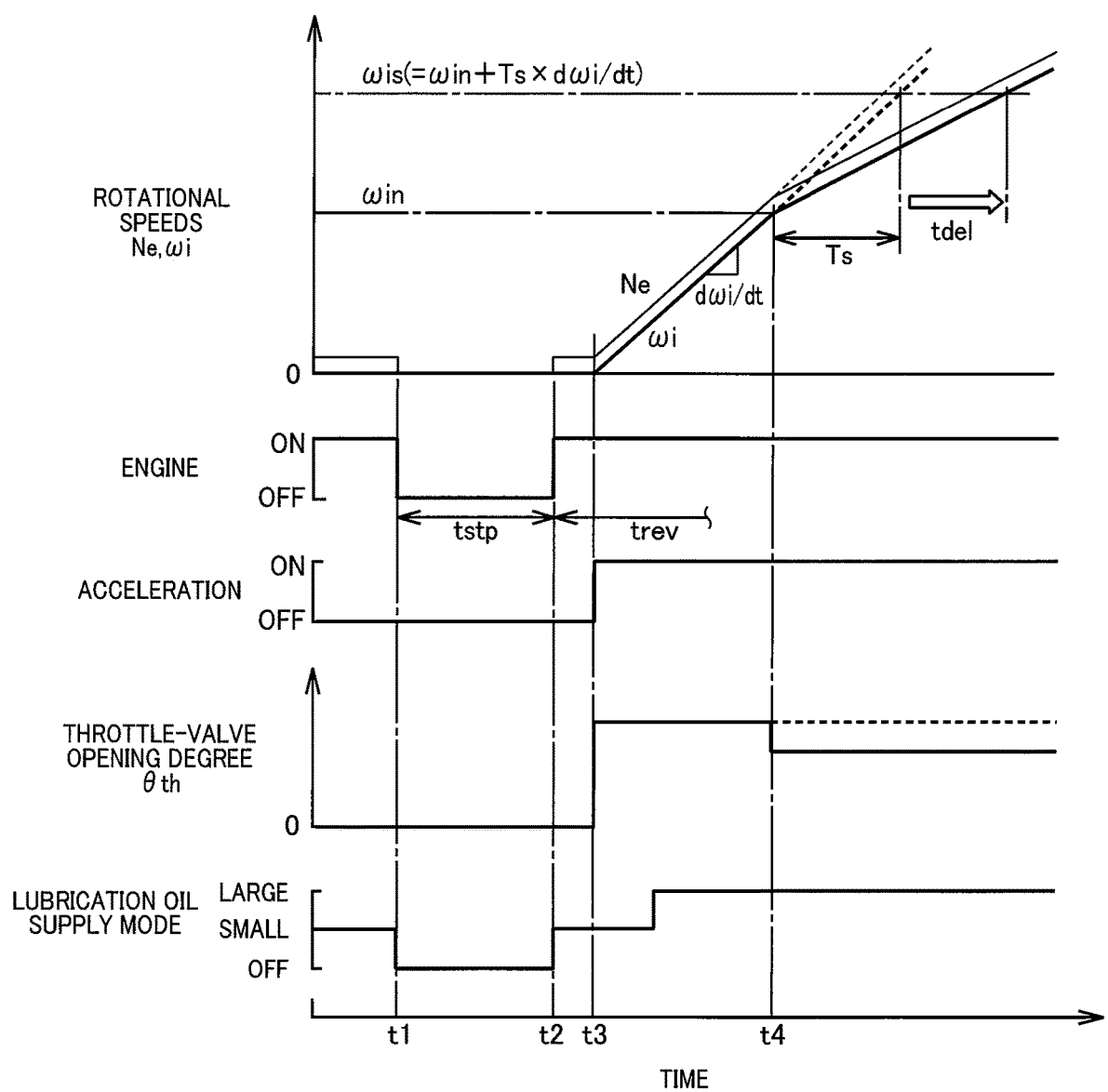
FIG. 11 is a time chart showing, by way of example, changes of operation states of respective various parts during executions of control operations, which are executed as shown in the flow chart of FIG. 10, when the vehicle starts running and is accelerated, for restraining the increase of the input rotational speed of the automatic transmission of FIG. 1.

As described above, in the above-described embodiment, the increase of the input rotational speed ωi is restrained by shifting up the automatic transmission 10 in advance. However, the increase of the input rotational speed ωi may be restrained also by limiting the throttle-valve opening degree θth of the electronic throttle valve 62, namely, limiting the intake air quantity Q of air intaken into the engine 30, as at step R7-1 of a control routine shown in a flow chart of FIG. 10, for example. FIG. 11 is an example of a time chart of a case in which an affirmative determination (YES) is made at step S6 with the estimated force value Fpp becomes not smaller than the predetermined threshold α at time t4, and the step R7-1 is implemented at the time 4 whereby the throttle-valve opening degree θth is limited, specifically, the throttle-valve opening degree θth is reduced by a certain degree, so that a rate dωi/dt of the increase of the input rotational speed ωi (i.e., rotational acceleration dωi/dt of the input shaft 22) is made lower than in an arrangement in which the throttle-valve opening degree θth is not limited. Thus, with the throttle-valve opening degree θth being limited, a length of time until the input rotational speed ωi reaches the estimated speed value ωis, i.e., a length of time until the piston pressing force Fp is estimated to be not smaller than the predetermined threshold α, is increased by a delay time tdel, so that the fluid can be kept supplied to the canceller chamber 132 through the second line-pressure passage 116 during the delay time tdel, whereby the second clutch C2 is restrained from being dragged due to shortage of the fluid in the canceller chamber 132.

While the preferred embodiment of this invention has been described in detail by reference to the drawings, it is to be understood that the embodiment described above is given for illustrative purpose only, and that the present invention may be embodied with various modifications and improvements which may occur to those skilled in the art.

NOMENCLATURE OF ELEMENTS

8: vehicle
10: automatic transmission
22: input shaft
28: mechanical oil pump
30: engine
46: drive wheels
48: hydraulic control unit
50: electronic control apparatus (control apparatus)
84: engine automatic-stop controlling portion
86: input-rotation limiting portion
90: fluid-amount calculating portion
94: pressing-force calculating portion
110: first line-pressure passage
112: first line-pressure regulator valve
114: second line-pressure regulator valve
116: second line-pressure passage
118: lubrication-required parts
120: hydraulic cylinder
126: piston
130: pressure chamber
132: canceller chamber
134: return spring
C1: first clutch (hydraulic friction engagement device)
C2: second clutch (hydraulic friction engagement device, released engagement device)
B1: first brake (hydraulic friction engagement device)
B2: second brake (hydraulic friction engagement device)
B3: third brake (hydraulic friction engagement device)
SL1-SL5: linear solenoid valves (engaging/releasing regulator valves)
PL: first line pressure
PL2: second line pressure
Pc2: C2 engaging hydraulic pressure
Fpp: estimated force value
α: predetermined threshold ωi: input rotational speed
ωis: estimated speed value
tstp: engine stop time
trey: elapsed time after engine start
Ts: predetermined length of time
Rp, Rc: fluid remaining amount
Sc: supplied fluid amount
Poil: pressure-chamber-side fluid amount
Coil: canceller-chamber-side fluid amount
Q: intake air quantity

What is claimed is:

1. A control apparatus for a vehicle that includes (i) a drive force source for driving the vehicle, and (ii) an automatic transmission disposed in a drive-force transmitting path between the drive force source and drive wheels of the vehicle,
wherein the automatic transmission includes a plurality of hydraulic friction engagement devices, and is configured to establish a plurality of gear positions depending on engaged/released states of the hydraulic friction engagement devices,
wherein each of at least one of the hydraulic friction engagement devices includes a hydraulic cylinder that has a piston, a pressure chamber defined on one of opposite sides of the piston and a canceller chamber defined on the other of the opposite sides of the piston, such that the piston is to be moved, based on a hydraulic pressure of a fluid supplied to the pressure chamber, in a forward direction that causes the each of the at least one of the hydraulic friction engagement devices to be engaged, and such that the canceller chamber is configured to cancel a thrust force based on a centrifugal hydraulic pressure of the fluid in the pressure chamber, by supply of the fluid to the canceller chamber,
wherein the automatic transmission further includes a hydraulic control unit including a mechanical oil pump that is to be mechanically driven by the drive force source to generate the hydraulic pressure, and configured to supply the fluid to the pressure chamber and the canceller chamber of the hydraulic cylinder,
wherein the control apparatus comprises an input-rotation limiting portion that is configured, when the vehicle starts running and is accelerated, with at least one of the at least one of the hydraulic friction engagement devices being released, to calculate an estimated speed value that is a speed value of an input rotational speed of the automatic transmission upon elapse of a predetermined length of time, and to calculate an estimated force value that is a force value of a piston pressing force acting on the piston in the forward direction in a released engagement device that is each of the at least one of the hydraulic friction engagement devices upon the elapse of the predetermined length of time, based on the centrifugal hydraulic pressure of the fluid in the pressure chamber of the released engagement device and the centrifugal hydraulic pressure of the fluid in the canceller chamber of the released engagement device that are dependent on the estimated speed value, and
wherein, when the estimated force value is not smaller than a predetermined threshold, the input-rotation limiting portion is configured to restrain an increase of the input rotational speed.

2. The control apparatus according to claim 1,
wherein the drive force source is an engine,
wherein the control apparatus further comprises an engine automatic-stop controlling portion configured, when the vehicle is stopped, to cause the engine to be automatically stopped, and
wherein, when the vehicle starts running and is accelerated after the engine has been automatically stopped by the engine automatic-stop controlling portion, the input-rotation limiting portion is configured to calculate the estimated speed value, and to calculate the estimated force value based on the centrifugal hydraulic pressure of the fluid in the pressure chamber and the centrifugal hydraulic pressure of the fluid in the canceller chamber, such that the input-rotation limiting portion restrains the increase of the input rotational speed when the estimated force value is not smaller than the predetermined threshold.

3. The control apparatus according to claim 1,
wherein the automatic transmission is configured to establish the plurality of gear positions including a plurality of forward gear positions providing gear ratios that are different from each other,
wherein the hydraulic cylinder of the released engagement device is connected to an input shaft of the automatic transmission, so as to be rotated at a rotational speed that is equal to the input rotational speed, and
wherein the input-rotation limiting portion is configured, when the estimated force value is not smaller than the predetermined threshold, to restrain the increase of the input rotational speed by shifting up the automatic transmission.

4. The control apparatus according to claim 2,
wherein the input-rotation limiting portion is configured, when the estimated force value is not smaller than the predetermined threshold, to restrain the increase of the input rotational speed by limiting an air intaken into the engine.

5. The control apparatus according to claim 1,
wherein the input-rotation limiting portion includes a fluid-amount calculating portion and a pressing-force calculating portion,
wherein the fluid-amount calculating portion is configured to calculate an amount of the fluid remaining in the canceller chamber, based on a length of time for which the mechanical oil pump had been stopped, and to calculate an amount of the fluid supplied to the canceller chamber, based on a length of time that elapsed from a start of the mechanical oil pump, such that the fluid-amount calculating portion obtains a canceller-chamber-side fluid amount by adding the amount of the fluid remaining in the canceller chamber and the amount of the fluid supplied to the canceller chamber, and
wherein the pressing-force calculating portion is configured to calculate, based on the estimated speed value and the canceller-chamber-side fluid amount, a reverse thrust force by which the piston is forced in a reverse direction opposite to the forward direction, and to obtain the estimated force value by subtracting the reverse thrust force from a forward thrust force that is dependent on the fluid in the pressure chamber.

6. The control apparatus according to claim 5,
wherein the fluid-amount calculating portion is configured to calculate an amount of the fluid remaining in the pressure chamber, based on the length of time for which the mechanical oil pump had been stopped, and wherein the pressing-force calculating portion is configured to calculate the forward thrust force, based on the estimated speed value and the amount of the fluid remaining in the pressure chamber, and to obtain the estimated force value by subtracting the reverse thrust force from the forward thrust force.

7. The control apparatus according to claim 1,
wherein the hydraulic control unit includes a line-pressure regulator valve and an engaging/releasing regulator valve that are connected to a line-pressure passage to which the fluid is to be supplied from the mechanical oil pump,
wherein the line-pressure regulator valve is configured to regulate the hydraulic pressure in the line-pressure passage, to a line pressure, by relieving a part of the fluid from the line-pressure passage, such that a relief fluid, which is the part of the fluid relieved by the line-pressure regulator valve, is supplied to the canceller chamber and lubrication-required parts, and
wherein the engaging/releasing regulator valve is configured to receive the line pressure, such that the fluid regulated by the engaging/releasing regulator valve is supplied to the pressure chamber.

8. The control apparatus according to claim 7,
wherein the hydraulic control unit further includes a second line-pressure regulator valve that is other than the line-pressure regulator valve as a first line-pressure regulator valve,
wherein the second line-pressure regulator valve is connected to a second line-pressure passage to which the relief fluid relieved by the first line-pressure regulator valve is supplied,
wherein the second line-pressure regulator valve is configured to regulate the hydraulic pressure in the second line-pressure passage, to a second line pressure, by relieving a part of the relief fluid from the second line-pressure passage, and
wherein the second line-pressure regulator valve is configured, when the mechanical oil pump is started, to reduce the second line pressure, such that a flow rate of the fluid supplied to the canceller chamber and the lubrication-required parts through the second line-pressure passage is reduced.

* * * * *